(12) United States Patent
Minnickel et al.

(10) Patent No.: US 11,043,828 B2
(45) Date of Patent: Jun. 22, 2021

(54) POWER SOURCE FOR BURST OPERATION

(71) Applicant: MILWAUKEE ELECTRIC TOOL CORPORATION, Brookfield, WI (US)

(72) Inventors: Kevin Minnickel, Mukwonago, WI (US); Brian Carrillo, Oshkosh, WI (US); Ryan B. Jipp, Brookfield, WI (US); Samuel Sheeks, Germantown, WI (US); Cameron R. Schulz, Milwaukee, WI (US); Aditya Subramanian, Brookfield, WI (US); Martin Guerrero, Burlington, WI (US); Izael Zapata, Burlington, WI (US); Jorge Michael Chavez, Kenosha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/591,224

(22) Filed: Oct. 2, 2019

(65) Prior Publication Data

US 2020/0036208 A1    Jan. 30, 2020

Related U.S. Application Data

(63) Continuation of application No. 15/849,763, filed on Dec. 21, 2017, now Pat. No. 10,491,020.
(Continued)

(51) Int. Cl.
*H01M 2/10* (2006.01)
*H02J 7/00* (2006.01)
(Continued)

(52) U.S. Cl.
CPC .............. *H02J 7/0068* (2013.01); *B25C 1/06* (2013.01); *B25F 5/02* (2013.01); *H01M 50/20* (2021.01); *H01M 50/267* (2021.01); *H01M 50/502* (2021.01); *H02J 7/008* (2013.01); *H02J 7/0031* (2013.01); *H02J 7/0063* (2013.01);
(Continued)

(58) Field of Classification Search
CPC ... B25C 1/06; H01M 2220/30; H01M 2/1022; H01M 2/1027; H01M 2/204; H02J 7/0031; H02J 7/0063; H02J 7/0068; H02J 7/008; H02J 7/345; H02K 7/14; H02P 4/00
See application file for complete search history.

(56) References Cited

U.S. PATENT DOCUMENTS 4,818,928 A   4/1989   Schosser
5,796,238 A   8/1998   Hiratsuka et al.
(Continued)

*Primary Examiner* — Muhammad S Islam
(74) *Attorney, Agent, or Firm* — Michael Best & Friedrich LLP

(57) ABSTRACT

A system, an electrical combination and a method for powering a load device. The combination may include a burst circuit configured to provide power to the load device to perform a burst operation, the burst circuit including a supercapacitor, a first switch between a power source and the supercapacitor and operable to control whether power is provided from the power source to charge the supercapacitor, and a second switch between the supercapacitor and the load device and operable to control whether power is provided from the supercapacitor to the load device; and an
(Continued)

electronic processor configured to control the first switch and the second switch based at least in part on a voltage of the supercapacitor.

18 Claims, 15 Drawing Sheets

Related U.S. Application Data

(60) Provisional application No. 62/380,098, filed on Dec. 22, 2016.

(51) Int. Cl.
| | |
|---|---|
| *H02K 7/14* | (2006.01) |
| *H02P 4/00* | (2006.01) |
| *H02J 7/34* | (2006.01) |
| *B25C 1/06* | (2006.01) |
| *B25F 5/02* | (2006.01) |
| *H01M 50/20* | (2021.01) |
| *H01M 50/267* | (2021.01) |
| *H01M 50/502* | (2021.01) |

(52) U.S. Cl.
CPC ............. *H02J 7/345* (2013.01); *H02K 7/14* (2013.01); *H02P 4/00* (2013.01); *H01M 2220/30* (2013.01)

(56) References Cited

U.S. PATENT DOCUMENTS

| | | | |
|---|---|---|---|
| 6,753,673 | B2 | 6/2004 | Shiue et al. |
| 6,886,730 | B2 | 5/2005 | Fujisawa et al. |
| 6,971,567 | B1 | 12/2005 | Cannaliato et al. |
| 7,854,360 | B2 | 12/2010 | Suda |
| 8,215,528 | B2 | 7/2012 | Matsunaga et al. |
| 8,297,373 | B2 | 10/2012 | Elger et al. |
| 8,742,724 | B2 | 6/2014 | Suzuki et al. |
| 9,041,322 | B2 | 5/2015 | Shimizu et al. |
| 9,085,076 | B2 | 7/2015 | Zhamu et al. |
| 9,399,281 | B2 | 7/2016 | Brendel et al. |
| 2006/0091858 | A1* | 5/2006 | Johnson ............... H02J 7/0063 320/128 |
| 2009/0015208 | A1* | 1/2009 | White ..................... B25F 5/00 320/150 |
| 2013/0224529 | A1* | 8/2013 | Lee ......................... H02J 7/00 429/7 |
| 2014/0199570 | A1* | 7/2014 | Cho .................... H01M 10/488 429/93 |
| 2015/0318784 | A1 | 11/2015 | Wu et al. |
| 2016/0229043 | A1 | 8/2016 | Wyler et al. |
| 2017/0170439 | A1 | 6/2017 | Jarvis et al. |

* cited by examiner

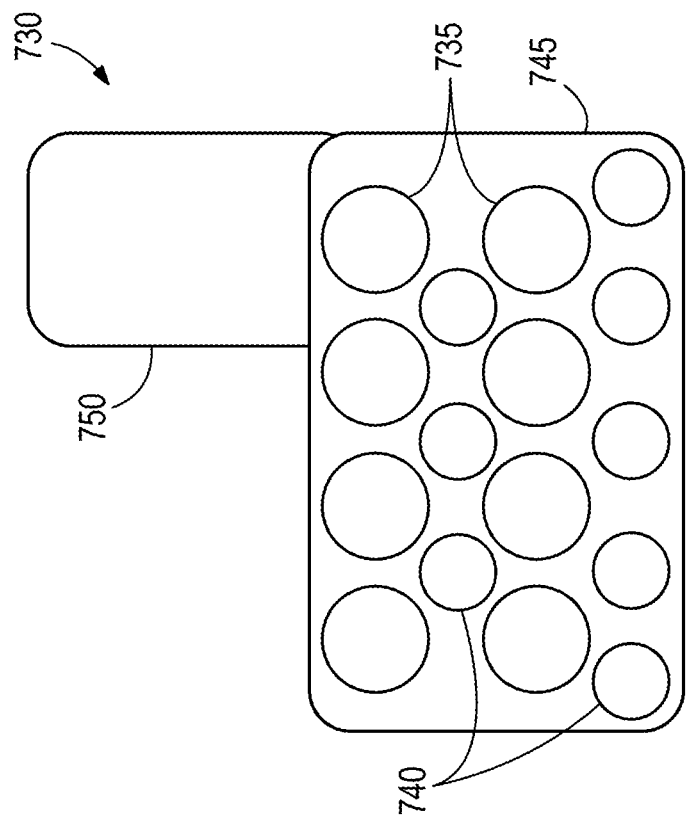
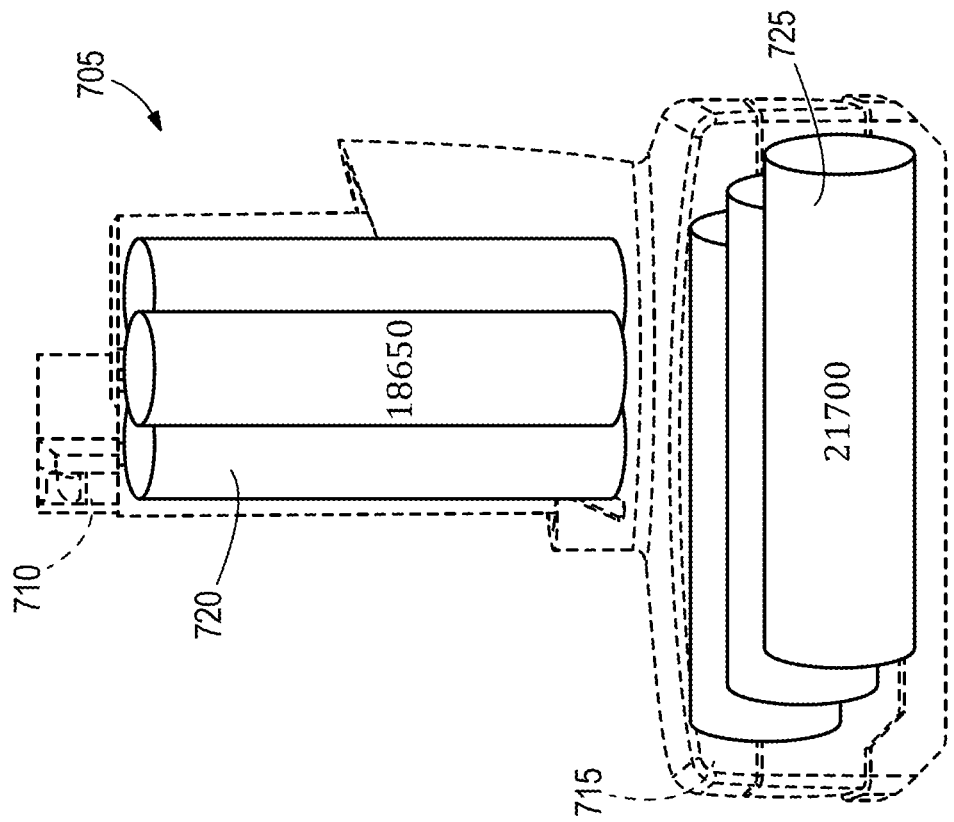
FIG. 7A
FIG. 7B

POWER SOURCE FOR BURST OPERATION

RELATED APPLICATIONS

This application is a continuation of U.S. patent application Ser. No. 15/849,763, filed Dec. 21, 2017, now U.S. Pat. No. 10,491,020, which claims priority to U.S. Provisional Application No. 62/438,098, filed Dec. 22, 2016, the entire contents of both of which are hereby incorporated by reference.

FIELD OF THE INVENTION

The present invention relates to power sources and, more specifically, to power sources that provide burst operation.

SUMMARY

Fastener drivers are used to drive fasteners (e.g., nails, staples, tacks, etc.) into a work piece. These fastener drivers operate through various means (e.g. compressed air, gas, powder, electrical energy, a flywheel mechanism, etc.) to provide a burst of power to drive the fastener into the work piece. However, these designs often have power, size, and cost constraints.

In one independent aspect, a battery-powered fastener driver may include a burst circuit with a supercapacitor for providing power to a motor of the fastener driver.

In another independent aspect, a battery pack may include battery cells with different characteristics. The battery cells may be of different physical size (e.g., different diameter, different length, etc.), shape (e.g., cylindrical, prismatic, etc.), chemistry (e.g., different lithium-based or other chemistries), operational characteristics (e.g., Ampere-hour (Ah) capacity, temperature performance, nominal voltage, etc.), combinations thereof.

In yet another independent aspect, a battery charger may execute a method of monitoring a health of a battery pack by determining direct current (DC) internal resistance of the battery pack based on a monitored voltage of the battery pack.

In a further independent aspect, a battery pack may include battery cells coupled by laser welding conductive straps to terminals of the battery cells.

In another independent aspect, an electrical combination for powering a load device may be provided. The electrical combination may generally include a burst circuit configured to provide power to the load device to perform a burst operation, the burst circuit including a supercapacitor, a first switch between a power source and the supercapacitor and operable to control whether power is provided from the power source to charge the supercapacitor, and a second switch between the supercapacitor and the load device and operable to control whether power is provided from the supercapacitor to the load device; and an electronic processor configured to control the first switch and the second switch based at least in part on a voltage of the supercapacitor.

In yet another independent aspect, a method of powering a burst operation of a load device may be provided. The method may generally include determining, with an electronic processor, that a voltage of a supercapacitor is greater than or equal to a burst voltage threshold; controlling, with the electronic processor and in response to determining that the voltage of the supercapacitor is greater than or equal to the burst voltage threshold, a first switch to open to prevent power from being provided by a power source to the supercapacitor, the first switch being between the power source and the supercapacitor; determining, with the electronic processor, that an actuator of the load device has been actuated; and controlling, with the electronic processor and in response to determining that the actuator has been actuated, a second switch to close to allow power to be provided from the supercapacitor to the load device to perform the burst operation, the second switch being between the supercapacitor and the load device.

In a further independent aspect, a battery pack may generally include a housing; a plurality of battery cells supported in the housing, the plurality of battery cells including a first battery cell having a first characteristic and a second battery cell having a second characteristic different than the first characteristic, the first characteristic and the second characteristic being at least one of a physical size, a shape, a chemistry, and an operational characteristic; and a terminal electrically connected to the first battery cell and the second battery cell.

Other independent aspects of the invention may become apparent by consideration of the detailed description, claims and accompanying drawings.

BRIEF DESCRIPTION OF THE DRAWINGS

FIG. 7A is a cut-away view of another battery pack including two different size battery cells.

FIG. 7B is a side view of yet another battery pack that also includes two different size battery cells.

DETAILED DESCRIPTION

Figure 1:
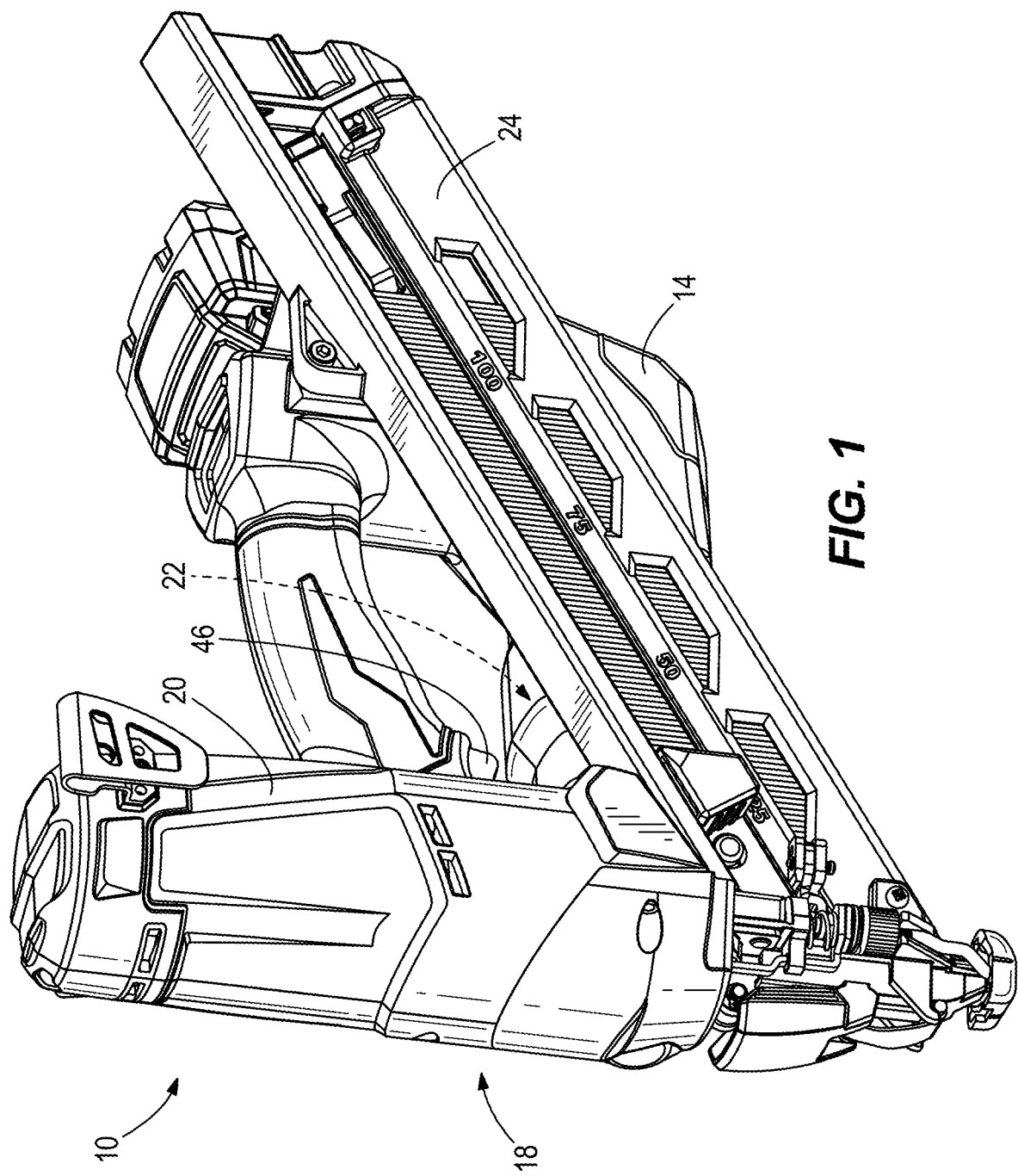
FIG. 1 is a perspective view of a battery-powered device, such as a nailer for driving nails into a work piece.

Before any independent embodiments of the application are explained in detail, it is to be understood that the application is not limited to the details of construction and the arrangement of components set forth in the following description or illustrated in the following drawings. The application is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 2:
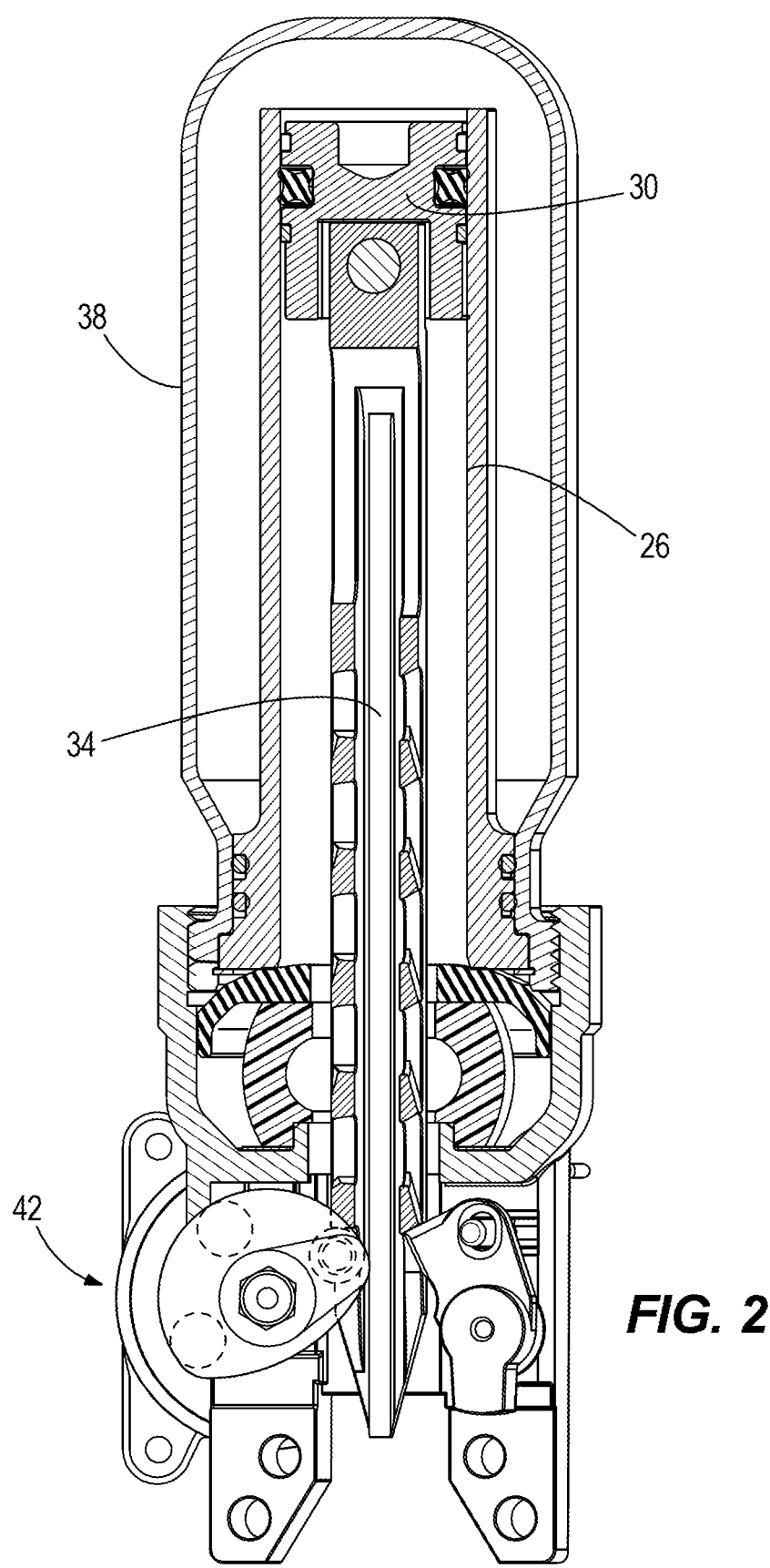
FIG. 2 is a partial cross-sectional view of a portion of the device of FIG. 1.

FIGS. 1-2 illustrate a battery-powered device 10 (i.e., a load device), such as, for example, a nailer that uses "burst operation" to drive nails into a work piece. In other constructions (not shown), the device 10 may include another fastener-driving device, such as a stapler, to drive staples, tacks, etc., or other power tools that use burst operation. In still other constructions (see, e.g., FIG. 5), the device 10 may include another powered device using a burst of power to supply a load, such as a jump starter used to start a vehicle engine.

In the illustrated construction, the device 10 is powered by a removable, rechargeable battery pack 14, such as a power tool battery pack. Alternatively, rechargeable battery cells (not shown) may be permanently housed within and non-removable from the device 10.

The nailing device 10 includes an onboard drive mechanism 18. In the illustrated construction, the drive mechanism 18 includes a gas-spring drive mechanism. In other constructions (not shown), the nailing device 10 may include another type of onboard drive mechanism, such as an air compressor, a vacuum pump, a mechanical energy storage element (e.g., a coil spring), etc.

The device 10 generally includes a housing 20 connectable to and operable to support the battery pack 14 and supporting the drive mechanism 18. An electric motor 22 (FIG. 1) is supported by the housing 20 and operable to drive the drive mechanism 18. Fasteners are supported in a magazine 24.

The gas spring-powered drive mechanism 18 includes a cylinder 26 and a movable piston 30 positioned within the cylinder 26 (FIG. 2). A driver blade 34 is attached to and movable with the piston 30. The drive mechanism 18 does not require an external source of air pressure but, rather, includes a storage chamber cylinder 38 of pressurized gas in fluid communication with the cylinder 26. In the illustrated embodiment, the cylinder 26 and movable piston 30 are positioned within the storage chamber cylinder 38.

With reference to FIG. 2, during a driving cycle, the driver blade 34 and the piston 30 are movable between a ready position (i.e., top dead center; see FIG. 2) and a driven position (i.e., bottom dead center; not shown). A lifting assembly 42, which is powered by the motor 22, is operable to move the driver blade 34 from the driven position to the ready position.

In operation, the lifting assembly 42 drives the piston 30 and the driver blade 34 to the ready position by energizing the motor 22. As the piston 30 and the driver blade 34 are driven to the ready position, the gas above the piston 30 and the gas within the storage chamber cylinder 38 is compressed. Once in the ready position, the piston 30 and the driver blade 34 are held in position until released by user activation of a trigger 46.

When released, the compressed gas above the piston 30 and within the storage chamber 38 drives the piston 30 and the driver blade 34 to the driven position, thereby driving a fastener into a workpiece. The illustrated drive mechanism 18 therefore operates on a gas spring principle utilizing the lifting assembly 42 and the piston 30 to further compress the gas within the cylinder 26 and the storage chamber cylinder 38.

In other constructions, on actuation of the trigger 46, a full driving cycle may be completed. More specifically, when the user actuates the trigger 46, the motor 22 is powered to cause the lifting assembly 42 to lift the piston 30 and the driver blade 34 and compress the gas. Upon reaching the ready position, the piston 30 and the driver blade 34 are immediately released to drive the fastener.

The structure and operation of the device 10 and the drive mechanism 18 may be similar to that disclosed in U.S. Patent Application Publication No. US 2016/022904 A1, published Aug. 11, 2016, the entire contents of which is hereby incorporated by reference.

When driving a nail into a work piece, the motor 22 is energized for a short period of time to cause the drive mechanism 18 to drive a nail and is de-energized until another nail is to be driven into the work piece. The operation of the device 10 may thus be referred to as a "burst operation" in which power is supplied (e.g., the motor 22 is energized) for short periods of time. For example, when the device 10 is used to drive twenty nails into a work piece over a one minute period, the motor 22 may be energized twenty times in bursts of one second or less (e.g., from about 0.05 seconds to about 0.10 seconds) to drive each nail into the work piece.

Figure 3A:
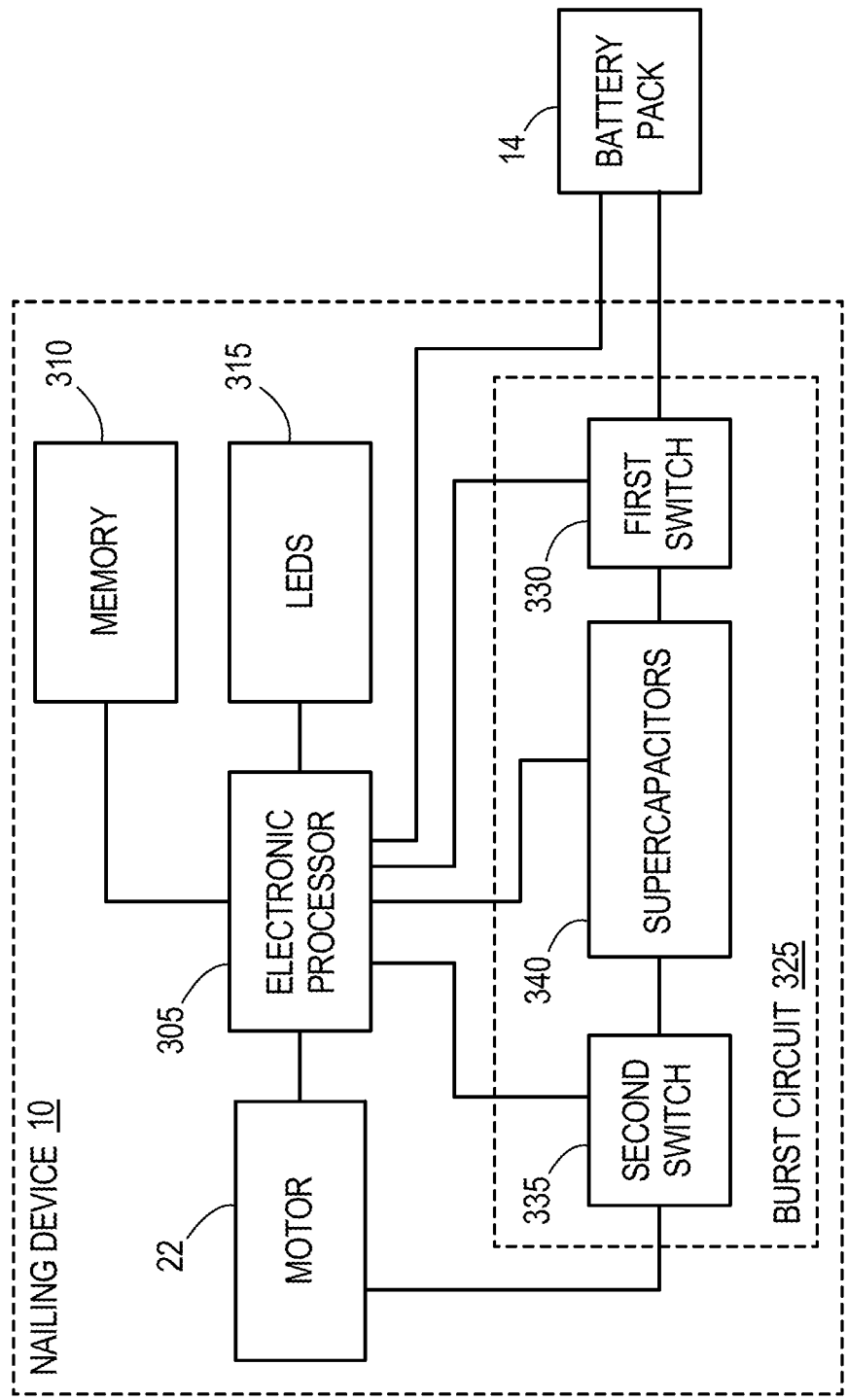
FIG. 3A is a block diagram of the device of FIGS. 1-2.

FIG. 3A illustrates a block diagram of the device 10. The device 10 includes an electronic processor 305 (for example, a microprocessor, or other electronic controller), a memory 310, an indicator (e.g., one or more light-emitting diodes (LEDs) 315), and the motor 22.

The memory 310 may include read only memory (ROM), random access memory (RAM), other non-transitory computer-readable media, or a combination thereof. The processor 305 is configured to receive instructions and data from the memory 310 and execute, among other things, the instructions. In particular, the processor 305 executes instructions stored in the memory 310 to perform one or more methods described herein. The processor 305 is also configured to control the LEDs 315 (for example, to indicate an operating state of the device 10, a condition of the battery pack 14, a voltage of the supercapacitor(s) 340, or the like) and receive electrical signals relating to the motor 22 (for example, a speed of the motor 22 as detected by Hall sensors and/or a current drawn by the motor 22 as detected by a current sensor).

The battery pack 14 provides power to the processor 305, the LEDs 315, and other control circuitry for the device 10. The battery pack 14 also charges the supercapacitor(s) 340 of a burst circuit 325, as explained in greater detail below.

Due to high current requirements of a burst operation, the battery pack 14 does not generally provide power for a burst operation (e.g., to drive a fastener into a work piece). For example, a burst operation of the device 10, such as the nailer, may require between approximately 100 A and 120 A to power the motor 22 to cause the lifting assembly 42 to move the piston 30 and the driver blade 34 to the ready position. A partially-charged battery pack and/or a battery pack with increased internal resistance (due to numerous charge-discharge cycles, damage, etc.) may not be able to provide the current required to power a burst operation.

Additionally, while a battery pack with sufficient charge and/or with a minimum internal resistance may be able to provide the necessary current for a burst operation, during such high current discharge, the voltage of the battery pack may decrease below the operating voltage of the processor 305 and other control circuitry. In such conditions, the processor 305 and the control circuitry may shut down, causing the device 10 to stop operating.

Accordingly, the device 10 is generally unable to operate or function properly when the battery pack 14 itself delivers the high current for a burst operation.

To provide the burst operation, the illustrated device 10 includes a burst circuit 325 for supplying a burst of power to the motor 22 (or other load). In some embodiments, the burst circuit 325 is located within the battery pack 14. In some constructions (such as the illustrated construction), the load (e.g., the motor 22) is powered solely by the burst circuit 325. In such constructions, battery cells of the battery pack 14 power the processor 305, the LEDs 315, and other control circuitry during a burst operation. In some constructions where the burst circuit 325 is located within the battery pack 14, the battery pack 14 includes different sets of terminals to respectively provide power from the burst circuit 325 and the battery cells. In other constructions, the battery pack 14 provides power from the burst circuit 325 and the battery cells through the same set of terminals and includes a switch to control whether the burst circuit 325 or the battery cells provide power (e.g., similar to the dual-powered device embodiment described below).

As shown in FIG. 3A, the illustrated burst circuit 325 includes a first switch 330, a second switch 335, and one or more supercapacitor(s) 340. In some embodiments, the supercapacitors 340 are connected in parallel (see FIG. 3B). Although the supercapacitors 340 are described and shown (in FIG. 3B) in the plural form, in some embodiments, the burst circuit 325 may include a single supercapacitor 340. It should also be understood that, in other embodiments (not shown), more than two supercapacitors 340 may be provided.

The first switch 330 connects the battery pack 14 to the supercapacitor(s) 340. The second switch 335 connects the supercapacitor(s) 340 to the motor 22. In some embodiments, the first switch 330 and the second switch 335 are field-effect transistors (FETs) controlled by the processor 305. The processor 305 is configured to control the state of the first switch 330 and the state of the second switch 335 to allow or inhibit current to flow through each switch.

In some embodiments, the processor 305 monitors a voltage of the supercapacitor(s) 340. The processor 305 is also coupled to the battery pack 14 to monitor one or more characteristics of the battery pack 14 (e.g., measure a voltage of the battery pack 14 and/or receive information from the battery pack 14 indicative of a condition of the battery pack 14). For example, the battery pack 14 may include an electronic processor (not shown) communicating with the processor 305 through a communication terminal (not shown). Alternatively, the battery pack 14 may include a terminal (not shown) allowing the processor 305 to determine the temperature of the battery pack 14 (e.g., using a thermistor (not shown) within the battery pack 14). In some embodiments, the processor 305 may also monitor one or more characteristics of the load 22.

Figure 3B:
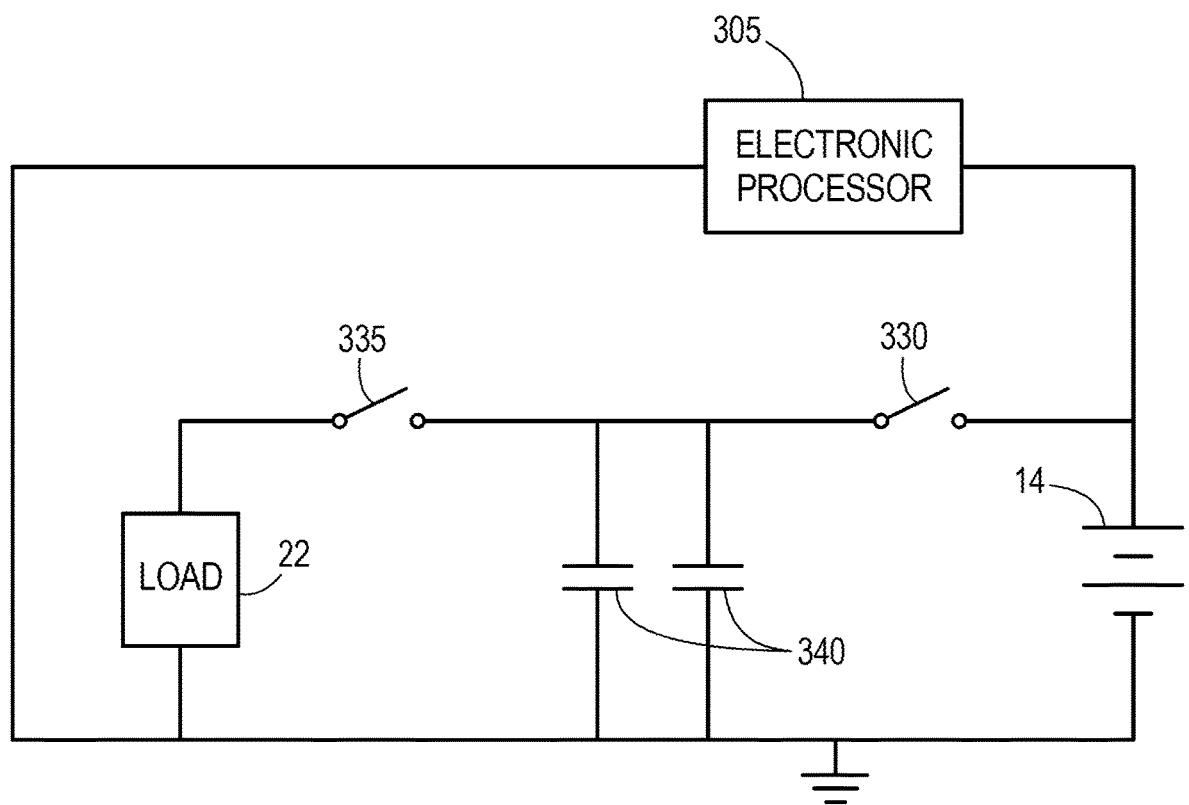
FIG. 3B is a circuit diagram of a portion of the device of FIGS. 1-2 according to one exemplary embodiment.

FIG. 3B illustrates how the battery pack 14 electrically couples to the supercapacitor(s) 340 and to the processor 305. As shown in FIG. 3B, the battery pack 14 is connected in parallel with the supercapacitor(s) 340 when the first switch 330 is closed. However, when the first switch 330 is open, the battery pack 14 is not connected to the supercapacitor(s) 340 and thus, current is unable to flow between the battery pack 14 and the supercapacitor(s) 340.

The first switch 330 may be closed to charge the supercapacitor(s) 340 using the battery pack 14. In some embodiments, the processor 305 controls the first switch 330 using a PWM signal to charge the supercapacitor(s) 340. For example, the PWM signal may begin with a relatively low duty cycle to prevent or limit high inrush current from being drawn by the supercapacitor(s) 340 having a low state of charge. As the voltage of the supercapacitor(s) 340 increases, the PWM duty cycle also increases until the supercapacitor(s) 340 are sufficiently charged, as explained in more detail below. In alternate embodiments, a resistor (not shown) in series with the first switch 330 is used to prevent or limit high inrush current from being drawn by the supercapacitor(s) 340.

In some embodiments, a boost converter (not shown) may be used when charging the supercapacitor(s) 340. In such embodiments, the voltage output of the battery pack 14 is matched to the voltage input of the supercapacitor(s) 340. The supercapacitor(s) 340 may thus be charged without controlling the first switch 330 using the PWM signal described above, reducing the resulting switching losses that occur.

As shown in FIG. 3B, the state of the second switch 335 determines whether the load 22 is connected to the supercapacitor(s) 340 (i.e., whether the load 22 receives power from the supercapacitor(s) 340). In the illustrated construction, when power is supplied from the supercapacitor(s) 340 to the load 22, the first switch 330 is placed (e.g., by the processor 305) in the open state to prevent feedback charging from the supercapacitor(s) 340 to the battery pack 14.

As shown in FIG. 3B, when the first switch 330 is open, the battery pack 14 remains connected to the processor 305 and other control circuitry of the device 10. Accordingly, during a burst operation of the device 10, power is supplied from the supercapacitor(s) 340 to power the load 22 (e.g., to power the motor to cause the drive mechanism 18 to drive a nail into a work piece); meanwhile, the battery pack 14 powers the processor 305 and other control circuitry of the device 10. Such a configuration allows for sufficient (high) current to be supplied to the load 22 to power a burst operation without the processor 305 and other control circuitry shutting down (e.g., because the voltage of the battery pack 14 drops below the operating voltage of the processor 305 and other control circuitry).

Similarly, in embodiments where the burst circuit 325 is located in the battery pack 14, the battery cells of the battery pack 14 remain connected to the processor 305 and other control circuitry of the device 10 when the first switch 330 is open. Accordingly, during a burst operation of the device 10, power is supplied from the supercapacitor(s) 340 to power the load 22 (e.g., to power the motor to cause the drive mechanism 18 to drive a nail into a work piece); meanwhile, the battery cells of the battery pack 14 power the processor 305 and other control circuitry of the device 10. As mentioned above, such a configuration allows for sufficient (high) current to be supplied to the load 22 to power a burst operation without the processor 305 and other control circuitry shutting down. In some embodiments, the electronic processor 305 that controls the switches 330 and 335 and monitors the voltage of the supercapacitor(s) 340 is located in the battery pack 14.

Figure 4A:
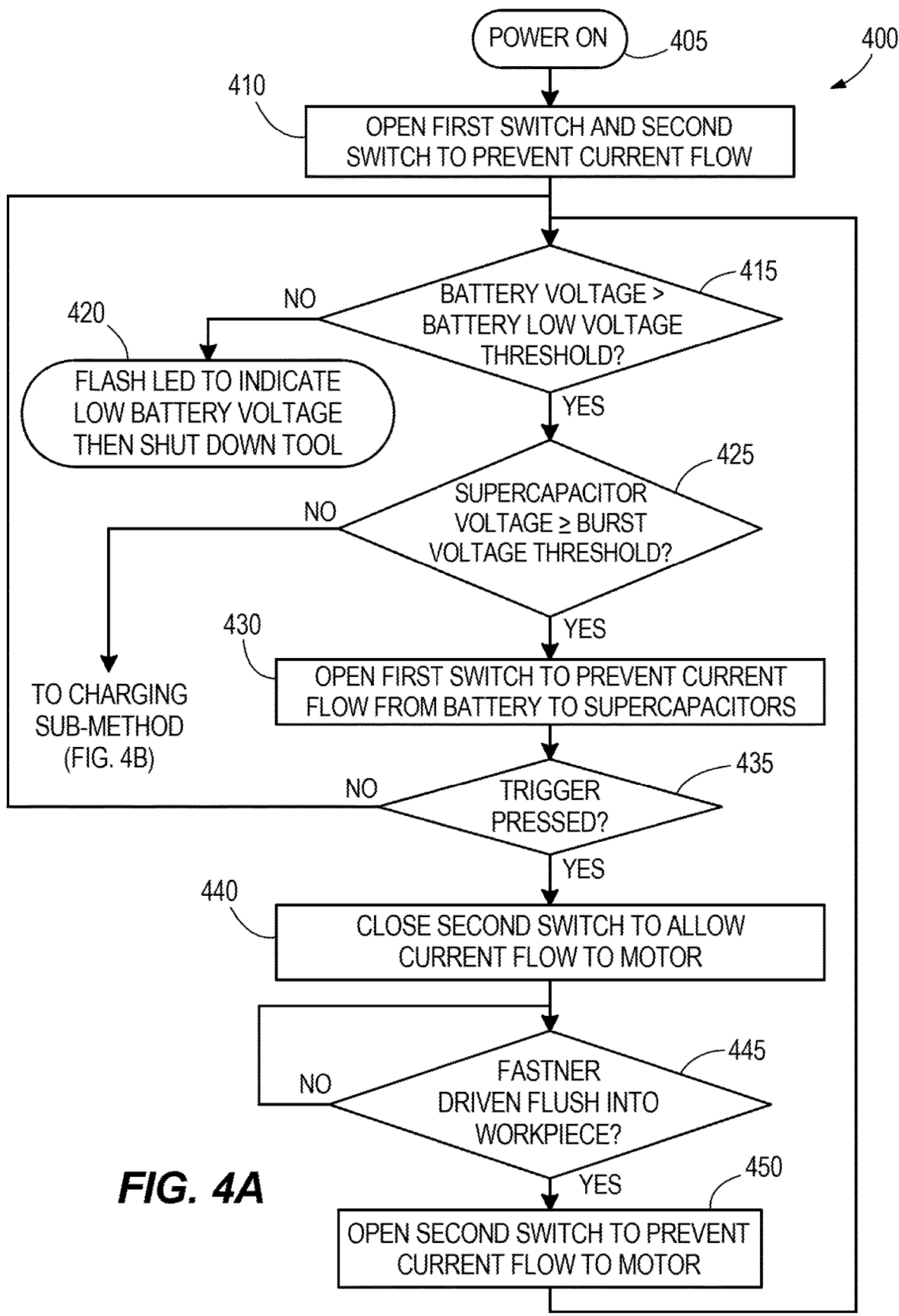
FIGS. 4A-4B are flowcharts of a method of powering burst operations of the device of FIGS. 1-2 using supercapacitors within the device.

FIG. 4A illustrates a method 400 of powering burst operations from the supercapacitor(s) 340. In some embodiments, including the illustrated embodiment, the method 400 is executed by the processor 305 of the device 10. At block 405, the device 10 is turned on. At block 410, the processor 305 opens the first switch 330 and the second switch 335 to prevent current from flowing to or from the supercapacitor(s) 340.

At block 415, the processor 305 determines whether the voltage of the battery pack 14 is greater than a battery low voltage threshold. When the voltage of the battery pack 14 is less than or equal to the battery low voltage threshold, at block 420, the processor 305 indicates low battery voltage (e.g., flashes an LED) and shuts down the device 10. In such a circumstance, the voltage of the battery pack 14 is too low to operate the device 10 (i.e., too low to charge the supercapacitor(s) 340). The flashing LED may indicate to a user that the battery pack 14 needs to be replaced or recharged.

When the voltage of the battery pack 14 is greater than the battery low voltage threshold, at block 425, the processor 305 determines whether the voltage of the supercapacitor(s) 340 is greater than or equal to a burst voltage threshold. In some embodiments, the burst voltage threshold is indicative of whether the charge of the supercapacitor(s) 340 is sufficient to power a burst operation of the device 10. When the voltage of the supercapacitor(s) 340 is less than the burst voltage threshold, the method 400 proceeds to a charging sub-method 460 of FIG. 4B, explained in greater detail below.

When the voltage of the supercapacitor(s) 340 is greater than or equal to the burst voltage threshold, the processor 305 opens the first switch 330 to prevent current flow between the battery pack 14 and the supercapacitor(s) 340. At block 435, the processor 305 determines whether the trigger 46 is pressed. When the trigger 46 is not pressed, the method 400 proceeds back to block 415 to continuously monitor the voltage of the battery pack 14 and the voltage of the supercapacitor(s) 340.

When the trigger 46 is pressed, at block 440, the processor 305 closes the second switch 335 to allow current to flow to the motor 22 from the supercapacitor(s) 340. This closing of the second switch 335 starts a burst operation of the device 10 to, in the illustrated construction, drive a nail into a work piece. In some embodiments, the processor 305 controls the second switch 335 using a PWM signal during the burst operation.

At block 445, the processor 305 may determine whether an operation of the device 10 has been completed (e.g., whether the nail has been driven into a work piece by the device 10). If the operation has not been completed (e.g., if the fastener has not yet been fully driven into the work piece) and if further driving of the fastener is possible, the method remains at block 445 until completion or until discharge of the supercapacitor(s) 340 below the burst voltage threshold. If further driving is not possible, the processor 305 may alert the user (e.g., through the LEDs) of an incomplete or failed fastener driving operation.

When the operation has been completed, at block 450, the processor 305 opens the second switch 335 to prevent current from flowing to the motor 22 from the supercapacitor(s) 340, ending the burst operation.

After the second switch 335 is opened to end the burst operation at block 450, the method 400 returns to block 415 to repeat the method 400. Repetition of the method 400 allows for numerous burst operations of the device 10 powered by the supercapacitor(s) 340. In between these burst operations, the supercapacitor(s) 340 are charged by the battery pack 14 when the voltage of the supercapacitor(s) 340 is below a threshold (e.g., the burst voltage threshold).

Figure 4B:
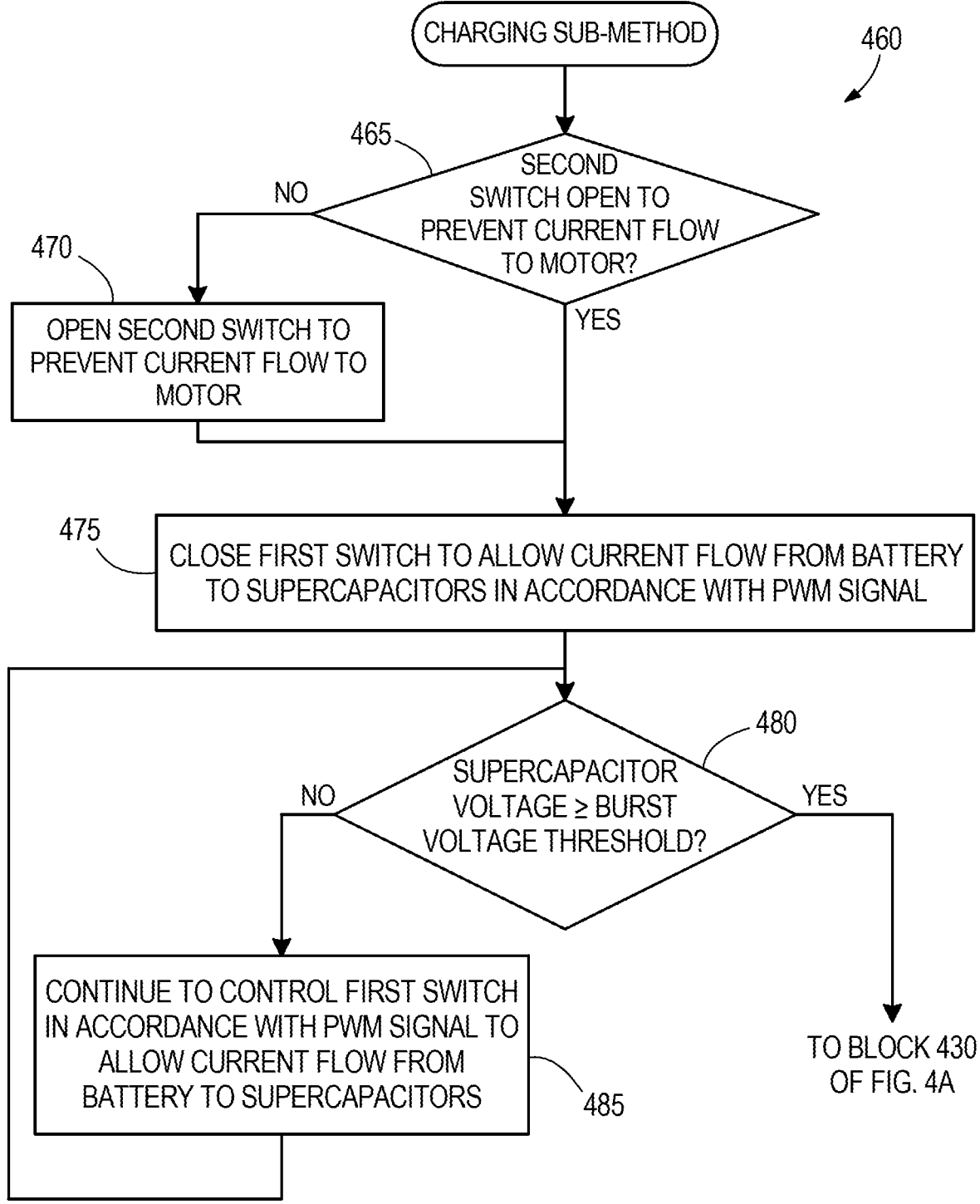

FIG. 4B illustrates the sub-method 460 for charging the supercapacitor(s) 340. As explained above, at block 425 (see FIG. 4A), when the voltage of the supercapacitor(s) 340 is less than the burst voltage threshold, the method 400 proceeds to the charging sub-method 460 shown in FIG. 4B.

At block 465, the processor 305 determines whether the second switch 335 is open to prevent current flow to the motor 22 from the supercapacitor(s) 340. If the second switch 335 is closed, at block 470, the processor 305 opens the second switch 335 to prevent current flow to the motor 22 from the supercapacitor(s) 340. The charging sub-method 460 then proceeds to block 475. At block 465, when the second switch 335 is already open, the charging sub-method 460 also proceeds to block 475.

At block 475, the processor 305 closes the first switch 330 to allow current flow from the battery pack 14 to the supercapacitor(s) 340 to charge the supercapacitor(s) 340. As explained above, in some embodiments, the processor 305 controls the first switch 330 using a PWM signal to charge the supercapacitor(s) 340.

At block 480, the processor 305 determines whether the voltage of the supercapacitor(s) 340 is greater than or equal to the burst voltage threshold. When the voltage of the supercapacitor(s) 340 remains below the burst voltage threshold, at block 485, the processor 305 continues to control the first switch 330 to allow current to flow from the battery pack 14 to the supercapacitor(s) 340 to charge the supercapacitor(s) 340. The charging sub-method 460 then returns to block 480 to continue monitoring the voltage of the supercapacitor(s) 340.

When the voltage of the supercapacitor(s) 340 is greater than or equal to the burst voltage threshold, the method 400 returns to block 430 (see FIG. 4A) to continue operation as described above. Thus, the method 400 and the sub-method 460 allow the supercapacitor(s) 340 to power burst operations of the device 10 and to be charged between burst operations of the device 10. The battery pack 14 is used to charge the supercapacitor(s) 340 between burst operations and to power the processor 305 and other control circuitry of the device 10 during and between burst operations.

In alternate embodiments, at block 435, a burst operation of the device 10 occurs upon a monitored characteristic of the device 10 exceeding a predetermined threshold while, at other times, operational power is provided by the battery pack 14. Such a device 10 is a dual-powered device—the load 22 is powered by the battery pack 14 and/or by the supercapacitor(s) 340. For example, in some embodiments, the device 10 may include a reciprocating saw, a circular saw, a drill, etc., (not shown) having a load sensor (not shown; e.g. a current sensor for the motor 22). The burst operation is provided to operate under an increased load (e.g., the saw "bogging down" or binding on the work piece).

For most operations (e.g., "normal" operations), the battery pack 14 is capable of supplying the required discharge current to power the load 22 while maintaining sufficient voltage to also power the processor 305 and the other control circuitry as necessary during operation. Under normal operating conditions, the load 22 of the dual-powered device (e.g., the saw, drill, etc.) is powered by the battery pack 14.

When the load sensor senses a load above a predetermined "burst load" threshold, the processor 305 may initiate a burst operation powered by the supercapacitor(s) 340. In other words, the processor 305 may disconnect the battery pack 14 from the load 22 and connect the supercapacitor(s) 340 to the load 22 to provide a burst of power.

When the load sensor senses that the load is below a "normal load" threshold, the processor 305 may re-initiate "normal" operations of the load 22 powered of the battery pack 14. The processor 305 may disconnect the supercapacitor(s) 340 from the load 22 and connect the battery pack 14 to the load 22 to provide "normal" power.

Figure 5:
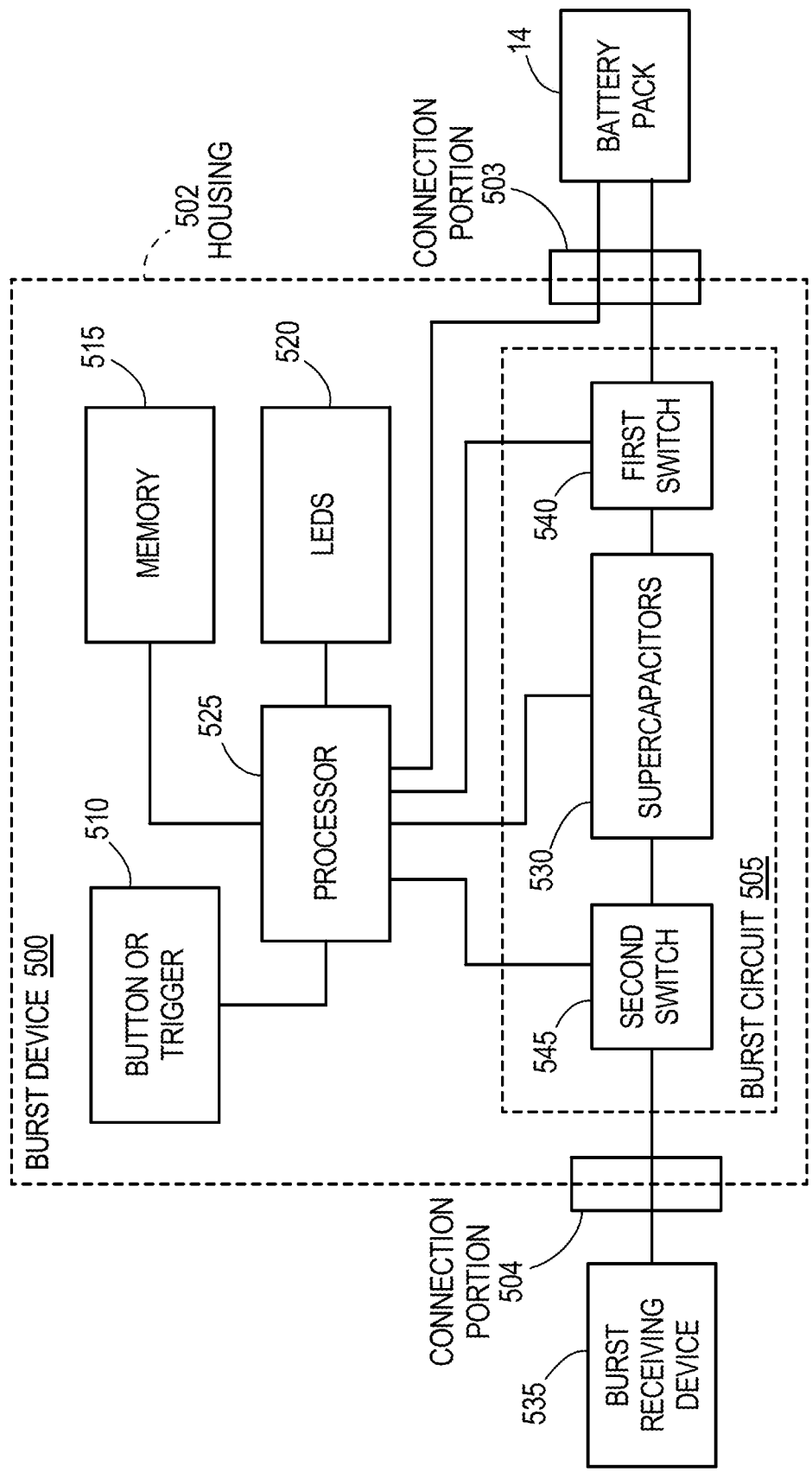
FIG. 5 is a block diagram of a separate burst device according to one exemplary embodiment.

FIG. 5 illustrates a block diagram of a burst device 500 (or burst adapter) including a burst circuit 505 (similar to the burst circuit 325) to provide power to an external load (e.g., a burst-receiving device 535). Such a burst device 500 may be a jumpstarting device for jumpstarting a vehicle battery. Alternatively, the burst device 500 take the form of an "adapter" configured to receive a battery pack (such as the battery pack 14) and separate from and connectable (e.g., at least electrically) to a load (e.g., a fastener-driving device (as disclosed in U.S. Patent Application Publication No. US 2016/022904 A1), another power tool, a non-motorized device, etc.) to provide burst power to a load.

In some embodiments, the burst device 500 is integrated into the battery pack 14. In other words, the battery pack 14 may include a burst circuit 505 that functions in a similar manner as the burst device 500 described below. In some embodiments, the electronic processor 525 that controls the switches 540 and 545 and monitors the voltage of the supercapacitor(s) 530 is located in a device outside of the burst device 500 (e.g., in the burst receiving device 535, in the battery pack 14, or the like).

The separate burst device 500 allows the supercapacitor(s) 530 of the burst circuit 505 to provide power to loads/devices that do not include a burst circuit 505, 325. In some embodiments (e.g., when the burst device 500 is a jump starting device for a vehicle battery), the burst device 500 is capable of providing between approximately 300 Amps and 600 Amps (or more depending on the number and characteristics of the supercapacitor(s) 530) to the burst-receiving device 535.

As shown in FIG. 5, the burst device 500 includes a housing 502 defining a battery connection portion 503 (e.g., a terminal block and a battery support) for electrical and/or mechanical connection to the battery pack 14 and a load connection portion 504 (e.g., a terminal block and a support) for electrical and/or mechanical connection to the load. The housing 502 supports a burst circuit 505, an actuator 510 (e.g., a button, a trigger, a signal-receiving unit, etc.), a memory 515, an indicator (e.g., one or more LEDs 520), and an electronic processor 525. These components are similar to the corresponding components described above with respect to the device 10 (see FIG. 3).

In the burst device 500, the processor 525 may monitor the actuator 510 to initiate a burst of power from supercapacitor(s) 530 to the burst-receiving device 535. The processor 525 may also control the LEDs 520 to indicate a status of the burst device 500 (for example, whether the supercapacitor(s) 530 are charged and capable of providing a burst of power), the battery pack 14 and/or the burst-receiving device 535.

Generally, the processor 525 controls operation of the burst circuit 505 in a similar manner to the operation of the burst circuit 325 of the device 10. For example, the processor 525 may execute the method 400 of FIG. 4A to provide one or more bursts of power from the supercapacitor(s) 530 to the load (the burst-receiving device 535) electrically coupled to the burst device 500.

The processor 525 may also execute the charging sub-method 460 of FIG. 4B to charge the supercapacitor(s) 530 using the battery pack 14 electrically coupled to the burst device 500. The processor 525 controls charging and discharging of the supercapacitor(s) 530 by controlling the first switch 540 and the second switch 545 in a similar manner to that of the burst circuit 325 of the device 10.

Figure 6B:
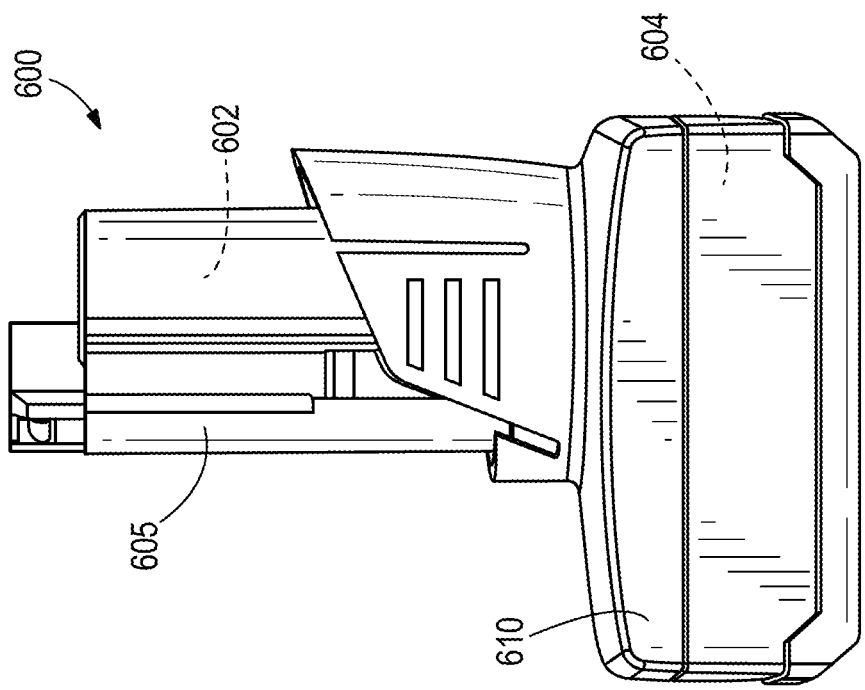
FIGS. 6A-6B are views of an alternate embodiment of a battery pack used to power the device of FIGS. 1-2.
Figure 6A:
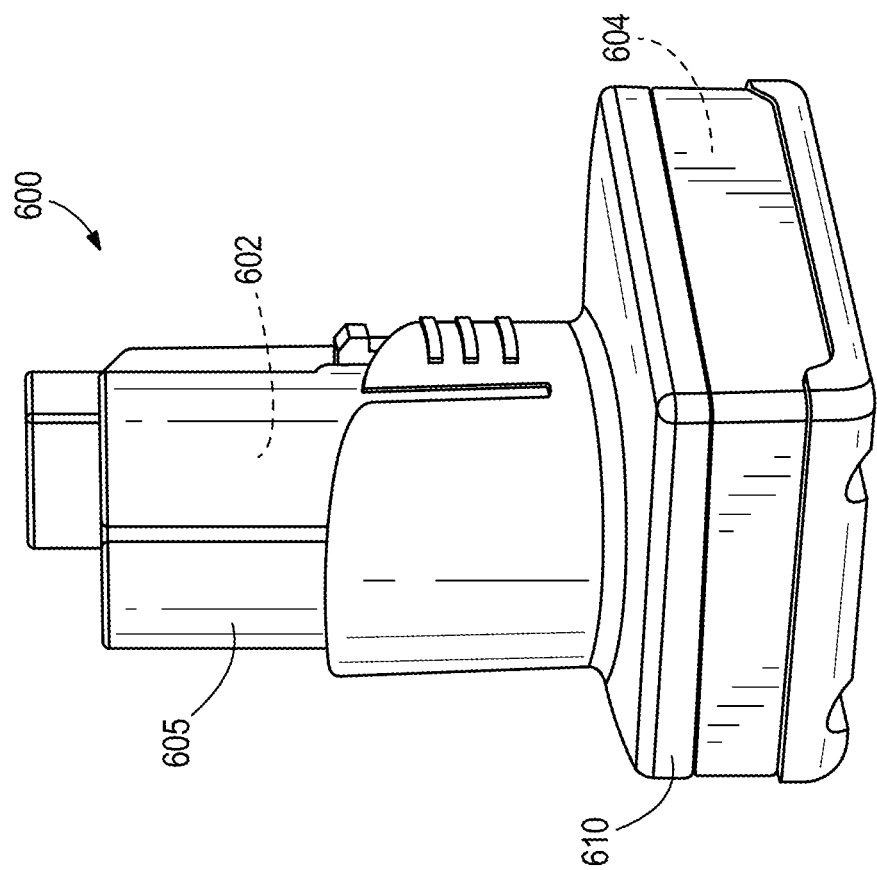

FIGS. 6A-6B illustrate a battery pack 600 including a number of first battery cells 602 (e.g., three; illustrated as being arranged vertically in a stem 605 of a housing of the battery pack 600) and a number of different second battery cells 604 (e.g., three; illustrated as being arranged horizontally in a base 610 of a housing of the battery pack 600). In some embodiments, the battery pack 600 operates in a similar manner as described above with respect to battery pack 14 and may be used to power the device 10. In some embodiments, the stem 605 is inserted into a battery receptacle (not shown) of a power tool (for example, the device 10). In such embodiments, the base 610 generally remains external to a housing (not shown) of the power tool.

The battery cells 602, 604 may be connected in any combination with each other to provide desired voltage and current outputs for a desired application. For example, in some embodiments, two battery cells 602 in the stem 605 are connected in parallel, two battery cells 604 in the base 610 are connected in parallel, and one battery cell 602 in the stem 605 and one battery cell 604 in the base 610 are connected in parallel. In such an exemplary configuration, the three sets of parallel battery cells 602, 604 may be connected in series.

In some embodiments, the battery cells 602, 604 are "18650" (18 mm in diameter by 65 mm in length) lithium-ion batteries.

In some embodiments, larger-sized battery cells (e.g., "26700" (26 mm by 70 mm) cells or "21700" (21 mm by 70 mm) cells compared to 18650 cells) may be used to provide increased ampere-hour capacity of a battery pack. Due to size constraints of the battery receptacle of the associated power tools, use of larger-sized battery cells in the stem 605 of the battery pack 600 may be limited. Specifically, increasing the size of the stem 605 to accommodate larger-sized battery cells would require increasing the size of the battery receptacle of the power tools to receive such a larger stem. However, use of larger-sized battery cells in the base 610 of the battery pack 600 would not generally require modification of the battery receptacle of power tools as the base 610 remains external to the power tool when the battery pack 600 is inserted.

FIG. 7A illustrates a cut-away view of a battery pack 705 including different types of battery cells (i.e., battery cells that include one or more different characteristics than each other). The battery cells may be of different physical size (e.g., different diameter, different length, etc.; see FIG. 7A), shape (e.g., cylindrical, prismatic, etc.), chemistry (e.g., different lithium-based or other chemistries), operational characteristics (e.g., Ampere-hour (Ah) capacity, temperature performance, nominal voltage, etc.), combinations thereof. In some embodiments, the battery pack 705 operates in a similar manner as described above with respect to the battery pack 14 and may be used to power the device 10.

Similar to the battery pack 600 shown in FIGS. 6A and 6B, the battery pack 705 includes a stem 710 and a base 715. The stem 710 houses a number of smaller-sized battery cells 720 (for example, three 18650 lithium-ion battery cells). The base 715 houses a number of larger-sized battery cells 725 (for example, three 21700 lithium-ion battery cells). In some embodiments (as illustrated), the battery cells 720, 725 have different diameters and different lengths (18650 compared to 21700; as shown in FIG. 7A). In other embodiments (not shown), the battery cells 720, 725 have only different diameters (18 mm compared to 21 mm) or different lengths (65 mm compared to 70 mm).

As mentioned above, in some embodiments, the battery cells 720, 725 have different operational characteristics (e.g., Ampere-hour (Ah) capacity, temperature performance, nominal voltage, etc.). For example, the battery cells 720, 725 may have different ampere-hour capacities. As illustrated, the larger-sized battery cells 725 (e.g., the 21700 cells) have a greater ampere-hour capacity than the smaller-sized battery cells 720 (e.g., the 18650 cells).

As another example, the battery cells 720, 725 may have different temperature performance characteristics (e.g., one set of battery cells may have a wider range of temperatures in which it may properly function or one set of battery cells may function better at low temperatures or high temperatures). The battery controller (not shown) may determine, based on the conditions (e.g., ambient and/or operational conditions), which battery cells 720, 725 to use to supply power.

In some embodiments, each smaller-sized battery cell 720 in the stem 710 is connected in parallel with one larger-sized battery cell 725 in the base 715. In alternate embodiments, multiple smaller-sized battery cells 720 may be connected in parallel with multiple larger-sized battery cells 725. The parallel combinations of battery cells 720 and 725 may be connected in any series combination with each other to provide desired voltage and current outputs for a desired application.

Although FIG. 7A shows the battery pack 705 as including six battery cells, in some embodiments, the battery pack 705 includes more or fewer battery cells that may be connected in a similar manner to the battery cells 720, 725. For example, FIG. 7B illustrates a battery pack 730 including eight larger battery cells 735 and eight smaller battery cells 740 in a base 745 of the battery pack 730. As shown in FIG. 7B, the smaller battery cells 740 may be positioned between rows of larger battery cells 735 and/or along a bottom of the base 745. Using battery cells of different sizes allows for space within the base 745 to be optimized to make the battery pack 730 less bulky and easier to manipulate.

The configuration of the battery cells 735 and 740 in FIG. 7B is merely exemplary and other configurations may be used. Although not shown in FIG. 7B, in some embodiments, a stem 750 of the battery pack 730 also includes battery cells, as previously explained with respect to FIGS. 6A, 6B, and 7A. In alternate embodiments (not shown), the stem 750 includes cylindrically-shaped battery cells, and the base 745 includes prismatic battery cells.

In some embodiments, the battery cells 720, 725 and the battery cells 735, 740 are coupled to each other by laser welding conductive straps to terminals of the battery cells, as explained in greater detail below.

Figure 7C:
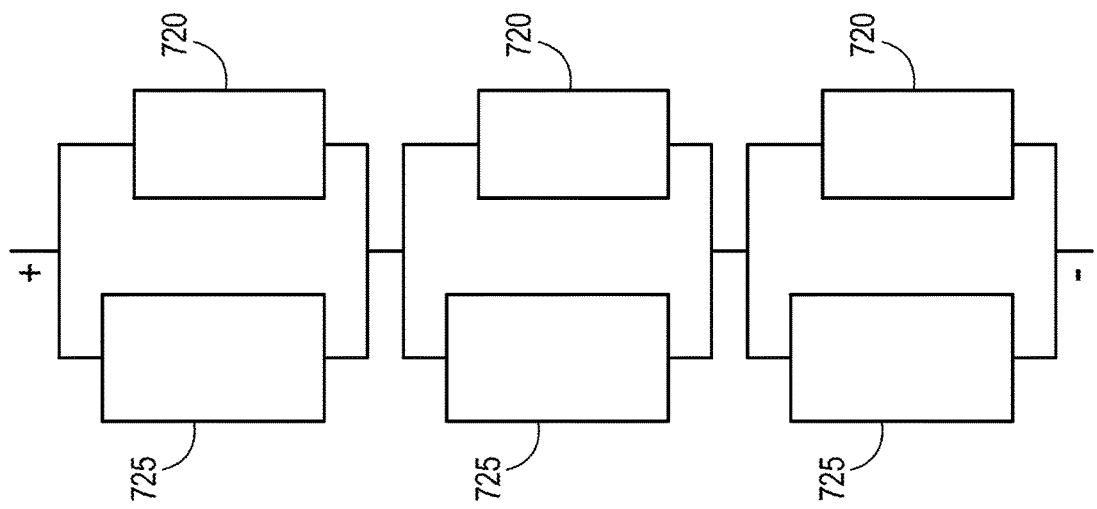
FIG. 7C is a circuit diagram of the battery cells of the battery pack of FIG. 7A.

Although several configurations of connections between the battery cells 720, 725 have been explained, the operation of the battery cells 720, 725 will be described with respect to the configuration that includes three parallel combinations of a smaller-sized battery cell 720 and a larger-sized battery cell 725. These three parallel combinations may be connected in series to provide a desired voltage (for example, approximately 12V) at the terminals of the battery pack 705. FIG. 7C illustrates a circuit diagram of the battery cells 720, 725 in such an exemplary configuration.

In the illustrated configuration, the total ampere-hour capacity of the battery pack 705 is the sum of the capacities of one smaller-sized battery cell 720 and one larger-sized battery cell 725. Accordingly, the total ampere-hour capacity of the illustrated battery pack 705 is increased compared to a battery pack including only six smaller-sized battery cells 720.

Despite the different characteristics of the battery cells 720, 725, as described above, in some embodiments, the battery cells 720, 725 have substantially the same nominal voltage. Within each parallel combination of a smaller-sized battery cell 720 and a larger-sized battery cell 725, the battery cells 720, 725 balance each other despite having different ampere-hour capacities because they have the same voltage. Thus, existing charging, discharging, and balancing methods of battery packs including battery cells of the same size and ampere-hour capacity may still be used with the battery pack 705 having different size and ampere-hour capacity battery cells 720, 725 (for example, to monitor and control charging and discharging of the battery pack 705).

Within each parallel combination of a smaller-sized battery cell 720 and a larger-sized battery cell 725, the larger-sized battery cell 725 has a higher impedance and a higher energy than the smaller-sized battery cell 720. Accordingly, the larger-sized battery cells 725 are referred to as energy cells while the smaller-sized battery cells 720 are referred to as low impedance cells.

With reference to FIG. 7C, in some embodiments, the battery pack 705 may include switches to disconnect either the battery cells 720 or the battery cells 725 depending on monitored characteristics of the battery pack 705. In such embodiments, the battery pack 705 provides power solely from a single type of battery cell intended to operate under the monitored characteristic (e.g., low temperature).

For example, when the battery cells 720 and 725 include different temperature characteristics, an electronic processor of the battery pack 705 may disconnect either the battery cells 720 or 725 based on a monitored temperature (e.g., ambient and/or of the battery pack 705). For example, when the battery pack 705 is in a cold environment (e.g., temperature less than a desired operating temperature for one set of battery cells 720 or 725), the processor may disconnect such battery cells. In such embodiments, the battery pack 705 provides power solely from the battery cells 720 or 725 intended to operate at lower temperatures (e.g., having a low temperature characteristic compared to the other cells).

In some embodiments, the battery pack 14, 600 and 705 includes an electronic processor (not shown) and a memory (not shown) that may be similar to the processor 305 and the memory 310 described above with respect to the nailing device 10 (see FIG. 3A). The battery pack 14, 600 and 705 may also include at least one sensor for monitoring an operational characteristic of the battery packs 14, 600, and 705 during operation.

For example, the battery pack 14, 600 and 705 may include a current sensor for monitoring a current provided by the battery pack 14, 600 and 705. In some embodiments, the processor of the battery pack 14, 600 and 705 may monitor an amount of time that the battery pack 14, 600 and 705 provide current to a device.

In some embodiments, the battery pack 14, 600, and 705 determines a type of device to which the battery pack 14, 600, and 705 is connected. In such embodiments, the processor of the battery pack 14, 600 and 705 may make such a determination by communicating with the processor 305 of the nailing device 10 or other device.

The memory of the battery pack 14, 600 and 705 may store monitored operational characteristics of the battery pack 14, 600 and 705. The memory of the battery pack 14, 600 and 705 may also store the type of device to which the battery pack 14, 600 and 705 is or was connected. Based on this information, the battery pack 14, 600 and 705 may provide information to a user to improve operation of the battery pack 14, 600 and 705.

For example, the battery pack 14, 600 and 705 may include a wireless communication controller to communicate with an external device (e.g., a smart phone). In such embodiments, the wireless communication controller and the external device may be similar to those disclosed in U.S. Patent Application Publication No. 2016/0342151, filed May 16, 2016, the entire contents of which is hereby incorporated by reference.

The battery pack 14, 600 and 705 may communicate with the external device to provide usage data of the battery pack 14, 600 and 705 (e.g., a type of device that the battery pack has been used to power in the past and operational characteristics of the battery pack 14, 600 and 705 during discharge) and predicted intended future operation of the battery pack 14, 600 and 705.

For example, when the battery pack 14, 600 and 705 is not suitable to the device or power tool to which it is connected, the battery pack 14, 600, and 705 may communicate with the external device to recommend an appropriate battery pack be used in place of the battery pack 14, 600 and 705 in future operations with device or power tool. In turn, the external device may communicate this information to the user (e.g., display this recommendation such that it is viewable by a user).

More specifically, when a low-capacity, discharged and/or damaged battery pack 14, 600 and 705 is connected to a high-demand power tool, the battery pack 14, 600, and 705 may communicate with the external device and/or to the user to recommend that a higher-capacity, fully-charged and/or new battery pack be used in place of the battery pack 14, 600 and 705 in future operations with the high-demand power tool.

Such a recommendation may extend the useful life of the battery pack 14, 600 and 705 by informing the user that a different battery pack would last longer than the battery pack 14, 600, and 705 when used with the high-demand power tool. Such a recommendation may also improve the functionality of the high-demand power tool by informing the user that a higher-capacity battery pack is better suited to power the high-demand power tool. In some embodiments, a specific alternate battery pack may be recommended based on the type of device being operated by the user.

As mentioned above, in some embodiments, the battery cells (e.g., the battery cells 602, 604 and/or the battery cells 720, 725) are electrically coupled by laser welding conductive straps to terminals of the battery cells. Laser welding allows dissimilar metals that may not be capable of being welded together using resistance welding to be welded together. Compared to resistance welding, laser welding may increase pull strength between objects that are welded together. Additionally, laser welding allows for softer metals to be welded together than resistance welding allows.

Figure 8:
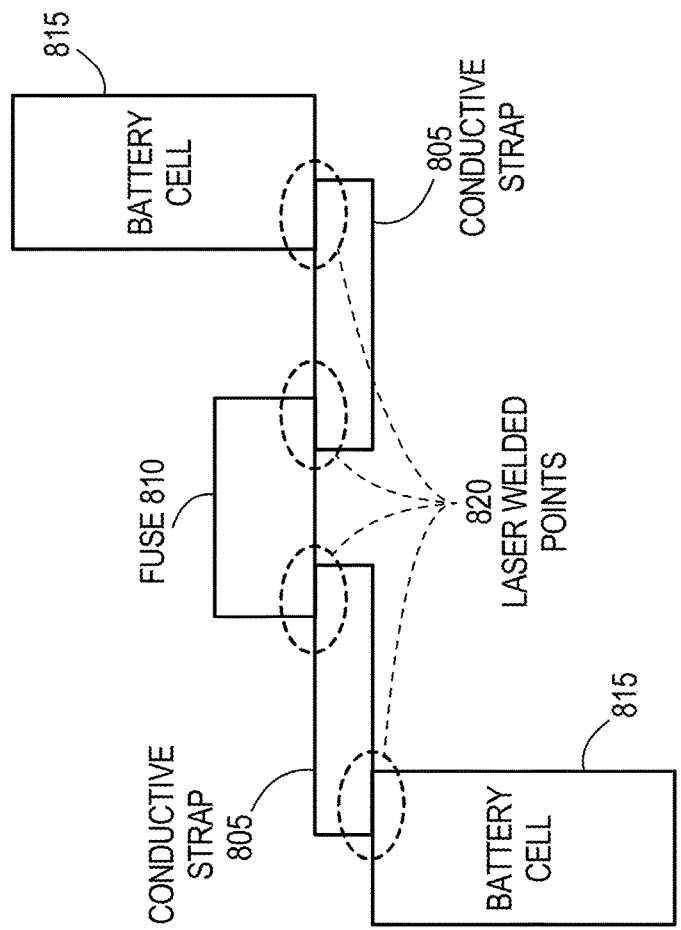
FIG. 8 is a block diagram of conductive straps electrically coupling a fuse between battery cells according to one exemplary embodiment.

FIG. 8 illustrates conductive straps 805 electrically coupling a fuse 810 between battery cells 815 at laser welds 820. In some embodiments, the conductive straps 805 are made of aluminum or copper and are laser-welded to a stainless steel battery terminal of the battery cells 815. The conductive straps 805 are also laser welded to aluminum or copper terminals of the fuse 810. In such embodiments, the conductive straps 805 and the terminals of the fuse 810 may also be made of dissimilar metals (e.g., conductive straps 805 made of aluminum and terminals of the fuse 810 made of copper or vice versa). In alternate embodiments, the conductive straps 805 may be made of copper with tin or with cladding layers of at least two materials of the group consisting of copper, stainless steel, and nickel.

In some embodiments, laser welding may allow battery cells with terminals made of dissimilar metals to be welded together. For example, cylindrical battery cells with battery terminals made of a first metal and prismatic battery cells with battery terminals made of a second metal may be electrically coupled by laser welding.

As mentioned above, compared to resistance welding, laser welding may increase pull strength between objects that are welded together (e.g., the conductive straps 805 and the battery cells 815). Different geometries of laser welding patterns may increase the pull strength between welded objects.

Figure 9B:
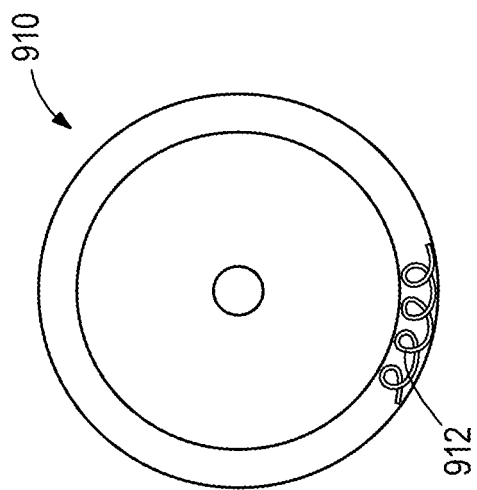
FIGS. 9A-9C illustrate exemplary geometries of laser welding patterns according to some embodiments.
Figure 9C:
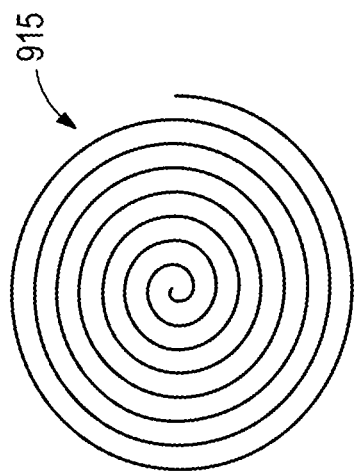
Figure 9A:
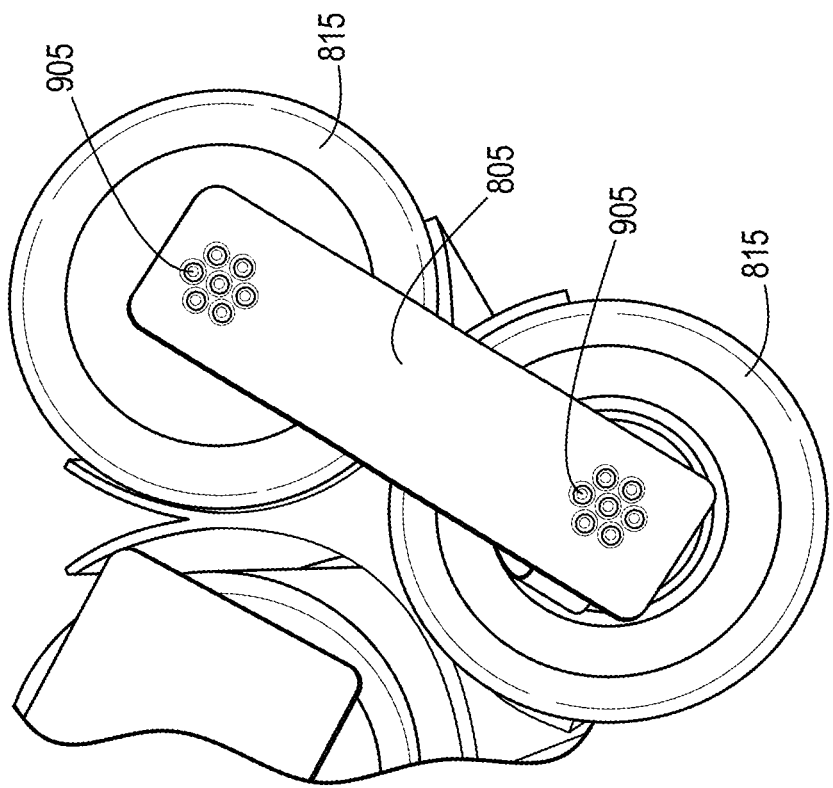

FIGS. 9A-9C illustrate exemplary geometries of laser welding patterns used to weld conductive straps 805, fuses 810, and/or battery cells 815 together. FIG. 9A shows a conductive strap 805 laser welded between the terminals of two battery cells 815 using a flower geometry pattern 905. As shown in FIG. 9A, the illustrated flower geometry pattern 905 includes six spot welds that surround a single spot weld. However, in alternate embodiments (not shown), more or fewer spot welds surround the central spot weld.

FIG. 9B shows a target geometry pattern 910 with a spot weld surrounded by a circular weld. In some embodiments, the circular weld is completed using overlapping loops as shown by loop pattern 912 in part of the circular weld of FIG. 9B. In alternate embodiments, additional spot welds may be included inside the circular weld. In some embodiments, the circular weld may surround the flower geometry pattern 905 shown in FIG. 9A.

FIG. 9C shows a spiral geometry pattern 915. In some embodiments, the spiral geometry pattern 915 may be surrounded by the circular weld of FIG. 9B. The laser welding geometry patterns 905, 910 and 915 shown in FIGS. 9A-9C are merely exemplary. Additional laser welding geometry patterns may be used in alternate embodiments.

Laser welding may increase the overall pull strength by increasing the pull strength in at least one direction compared to resistance welding. For example, the generally circular shape of the geometry patterns 905, 910 and 915 shown in FIGS. 9A-9C provide similar pull strength in all directions. In contrast, resistance-welding patterns generally include only straight line welds in one or two directions and do not provide similar pull strength in all directions.

When the battery packs 14, 600 and 705 are depleted, a charger 1005 (see FIG. 10) may be used to recharge the battery packs 14, 600 and 705. Although the below explanation of the charger 1005 refers to charging of the battery pack 14, the same concepts and methods apply to charging the battery packs 600 and 705 and to other battery packs (not shown).

Figure 10:
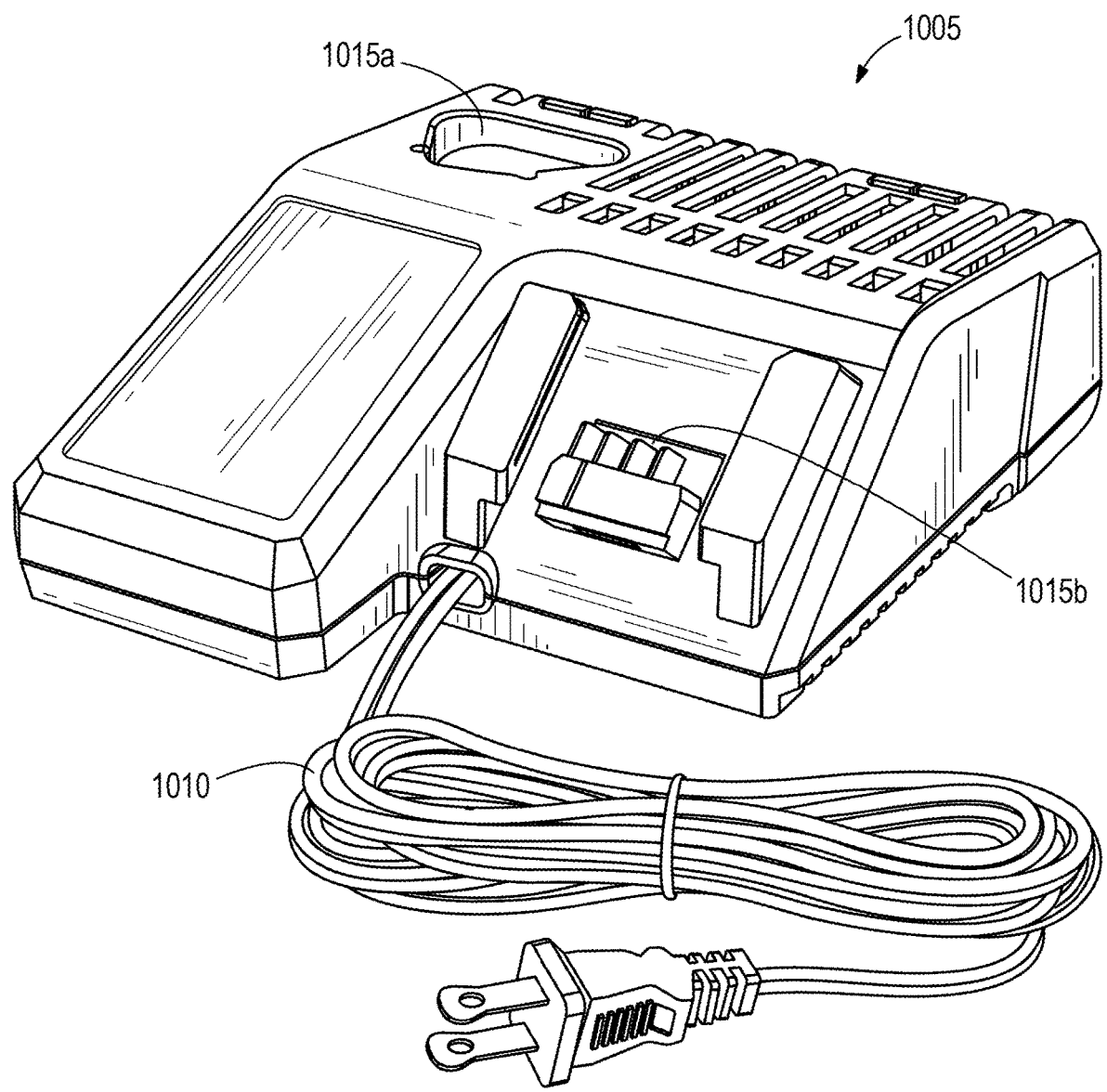
FIG. 10 is a perspective view of a charger, for example, for charging the battery packs of FIGS. 6A, 6B, and 7.

As shown in FIG. 10, the charger 1005 includes a power cord 1010 for connecting to a power source (e.g., a wall outlet for AC power) to provide power to the charger 1005. The charger 1005 also includes one or more battery pack receptacles 1015 (two shown) for receiving battery packs. One receptacle 1015a is configured to receive the battery pack 14 (for example, the stem of the battery pack 14 inserted into the receptacle 1015a) while the other receptacle 1015b is configured to receive battery packs of an alternate shape (e.g., a slide-on battery pack).

Figure 11:
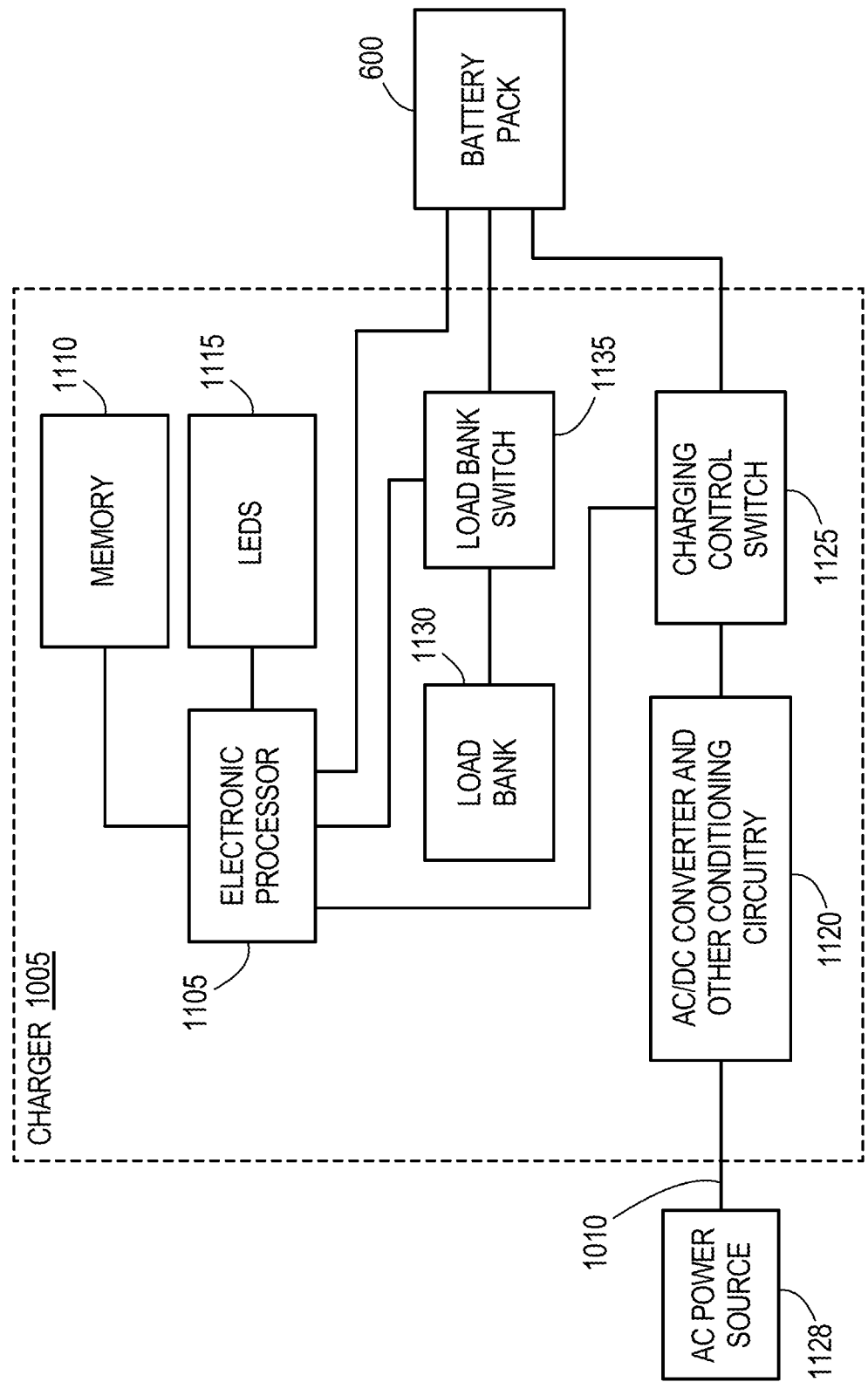
FIG. 11 is a block diagram of the charger of FIG. 10.

FIG. 11 illustrates a block diagram of the charger 1005. In some embodiments, the charger 1005 includes some similar components as the device 10. For example, the charger 1005 includes an electronic processor 1105, a memory 1110, and an indicator (e.g., LEDs 1115). These components may have similar functionality to the corresponding components described above with respect to the device 10 (see FIG. 3A).

The charger 1005 also includes an AC/DC converter and other conditioning circuitry 1120 and a charging control switch 1125. In some embodiments, the charging control switch 1125 includes a FET controlled by the processor 1105. For example, when the charging control switch 1125 is closed, current flows from an alternating current (AC) power source 1128 through the AC/DC converter and other conditioning circuitry 1120 to charge the battery pack 14. In some embodiments, the processor 1105 controls the charging control switch 1125 using a PWM signal.

The charger 1005 also includes a load bank 1130 and a load bank switch 1135. The load bank switch 1135 is controlled by the processor 1105 to connect the battery pack 14 to one or more testing loads instead of to the AC/DC converter and other conditioning circuitry 1120 and the AC power source 1128. While FIG. 11 shows a single load bank switch 1135, in some embodiments, the charger 1005 includes multiple load bank switches.

In some embodiments, the processor 1105 executes a method of monitoring battery health by determining a DC internal resistance of the battery pack 14. The DC internal resistance of a battery pack is indicative of the health of the battery pack. As a battery pack ages, the DC internal resistance tends to increase which, in turn, decreases performance of the battery pack.

The DC internal resistance affects the capacity of the battery pack—the higher the DC internal resistance of a battery pack, the higher the losses while charging and discharging the battery pack. These losses increase as the charging current or discharging current increase. In other words, the higher the discharge rate of a battery pack, the lower the available capacity of the battery pack.

In some embodiments, the DC internal resistance of the battery pack 14 is determined by the battery charger 1005 by monitoring the voltage of the battery pack 14 as a load connected to the battery pack 14 is varied. As the load connected to the battery pack 14 varies, the voltage of the battery pack 14 will also vary. From the monitored changes in voltage of the battery pack 14 as the load varies, the DC internal resistance of the battery pack 14, which, again, is indicative of the health of the battery pack 14, is determined.

Figure 12:
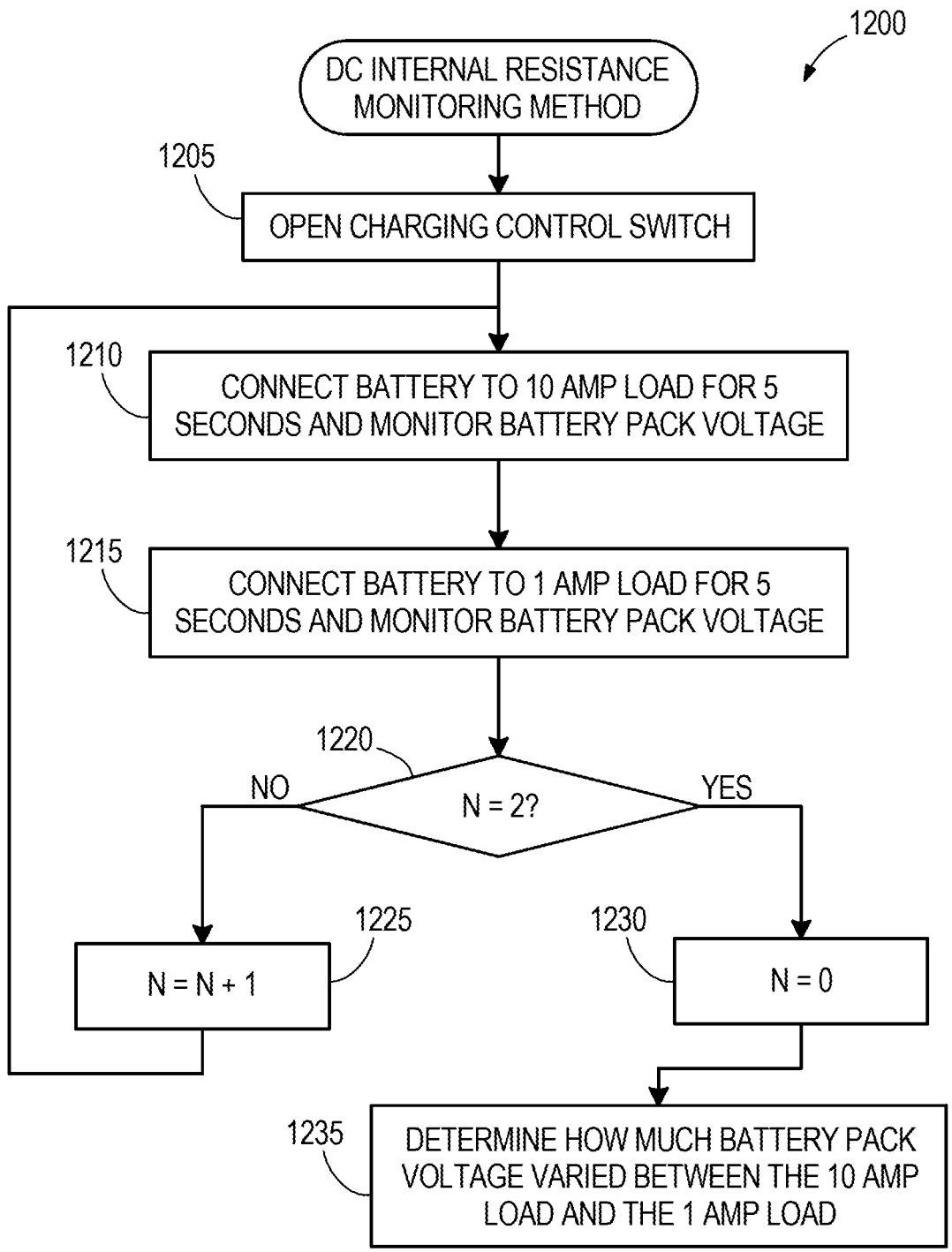
FIG. 12 is a flowchart of a method performed by the charger of FIGS. 10 and 11 of monitoring direct current (DC) internal resistance of a battery pack coupled to the charger.

FIG. 12 illustrates an exemplary method 1200 of monitoring the DC internal resistance of the battery pack 14. At block 1205, the processor 1105 opens the charging control switch 1125 to ensure that the battery pack 14 is disconnected from the charging power source 1128. At block 1210, the processor 1105 controls the load bank switch 1135 to connect the battery pack 14 to a first load of the load bank 1130 such that the battery pack 14 applies a first discharge current (e.g., ten amps). The battery pack 14 remains connected to this load for a time period (e.g., five seconds). During this time, the processor 1105 monitors the voltage of the battery pack 14.

At block 1215, the processor 1105 controls the load bank switch 1135 to connect the battery pack 14 to a second load of the load bank 1130 such that the battery pack 14 applies a second discharge current (e.g., one amp). The battery pack 14 remains connected to this load for a time period (e.g., five seconds). During this time, the processor 1105 monitors the voltage of the battery pack 14.

As indicated by blocks 1220 and 1225, blocks 1210 and 1215 are repeated a number of times (e.g., twice), and the voltage of the battery pack 14 continues to be monitored. After blocks 1210 and 1215 are repeated (in other words, after blocks 1210 and 1215 have been executed three times in total), at block 1230, the processor 1105 resets a variable N to zero such that the next time the method 1200 is executed, the blocks 1210 and 1215 will be executed once and then repeated the number of times more (in other words, blocks 1210 and 1215 are executed three times each time the method 1200 is executed).

At block 1235, the processor 1105 determines how much the voltage of the battery pack 14 varied from when the battery pack 14 was connected to the first load compared to when the battery pack 14 was connected to the second load. A large variance in the voltage of the battery pack 14 indicates a higher DC internal resistance and a less healthy battery pack 14 than does a smaller variance. In other words, the less the voltage of the battery pack 14 varied when the loads were switched, the healthier the battery pack 14.

The variance in voltage may be compared to a variance in the voltage of the battery pack 14 when the battery pack 14 was manufactured. An increase in the variance in the voltage of the battery pack 14 from the time of manufacture beyond a predetermined threshold (e.g., a 50% increase) may indicate that the battery pack 14 should be replaced or used only for lower power applications.

Figure 13:
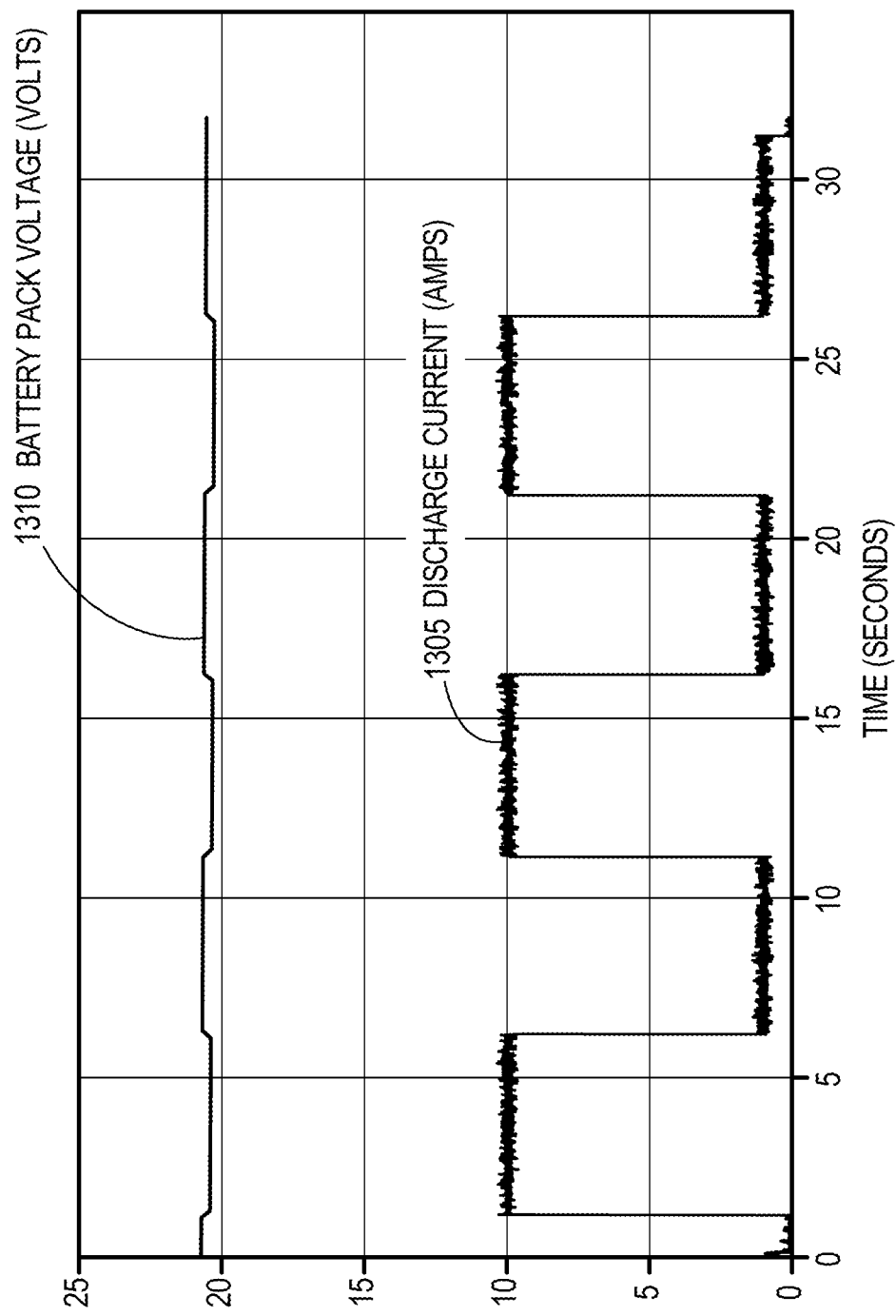
FIG. 13 is a graph showing exemplary results of the method of FIG. 12 being executed by the charger of FIGS. 10 and 11.

FIG. 13 illustrates a graph that shows exemplary results of the method 1200 being executed on an exemplary 18V battery pack. In FIG. 13, the x-axis of the graph represents time in seconds. The lower signal on the graph represents a discharge current 1305 of the battery pack in amps, and the upper signal represents a battery pack voltage 1310 in volts.

As shown in FIG. 13, the discharge current 1305 includes a number (e.g., six) of time period (e.g., five second) intervals that alternate between the first discharge current (e.g., ten amps) and the second discharge current (e.g., one amp). As shown in FIG. 13, the battery pack voltage 1310 varies as the discharge current 1305 of the battery pack 14 varies. As mentioned above, the amount of variance of the battery pack voltage 1310 indicates the health of the battery pack 14.

In some embodiments, the method 1200 is executed by the processor 1105 of the charger 1005 before charging of the battery pack 14. In other embodiments, the method 1200 is executed at other times (for example, after the battery pack 14 has been charged for a predetermined time, after the battery pack 14 has been charged to a predetermined capacity, after the battery pack 14 has been fully charged, etc.).

After executing the method 1200 to determine the health of the battery pack 14, the processor 1105 may control the LEDs 1115 to illuminate to indicate the health of the battery pack 14. For example, in some embodiments, the LEDs 1115 may include a green LED, a yellow LED, and a red LED. In such embodiments, the processor 1105 may illuminate the green LED when the battery health is in a first range indicating good health (for example, when the DC internal resistance is within 20% of its initial DC internal resistance). The processor 1105 may illuminate the red LED when the battery health is in a second range indicating poor health (for example, when the DC internal resistance has increased by 50% or more of its initial DC internal resistance). The processor 1105 may illuminate the yellow LED when the battery health is in a third range between the first range and the second range. It should be understood that these ranges are merely exemplary and may be different in other embodiments.

In alternate embodiments, the LEDs 1115 may include a plurality of single-color LEDs that the processor 1105 controls to illuminate in a similar manner as described above with respect to the green, yellow, and red LEDs. For example, in an embodiment with five single-color LEDs, the processor 1105 may illuminate all five LEDs when the battery pack 14 is in good health and may only illuminate one single-color LED when the battery pack 14 is in poor health. Accordingly, the charger 1005 may determine and notify a user (through the LEDs 1115) when the battery pack 14 is in poor health.

In some embodiments, the charger 1005 includes a wireless communication controller to communicate with an external device (e.g., a smart phone). In such embodiments, the wireless communication controller and the external device may be similar to those disclosed in U.S. Patent Application Publication No. 2016/0342151.

In some embodiments, the charger 1005 provides information to the external device using the wireless communication controller after the health of the battery pack 14 (i.e., the DC internal resistance of the battery pack 14) is determined. For example, when the DC internal resistance of the battery pack 14 increases above a predetermined threshold (i.e., when the measured variance in voltage during load switching increases above a predetermined threshold), the charger 1005 may provide a recommendation to the external device that the battery pack 14 should be replaced or that the battery pack 14 should only be used to power low-demand devices (e.g., light duty tools and devices such as a work light). In turn, the external device communicates this information to a user (e.g., displays this recommendation such that it is viewable by the user).

As mentioned above, such a recommendation may increase the useful life of the battery pack 14 and/or may increase the performance of devices (e.g., high-demand devices) by informing the user of an ideal use for the battery pack 14 based on its health. Thus, newer battery packs with good health may be used to power high-demand devices while older battery packs with diminished health are more appropriate to power low-demand devices.

While the charger 1005 is described as including the wireless communication controller above, in some embodiments, the battery pack 14 and/or the nailing device 10 may include a wireless communication controller to communicate with the external device. In such embodiments, the processor 1105 of the charger 1005 may communicate with the battery pack 14 such that the battery pack 14 stores battery health information in its memory. The battery pack 14 may then communicate the battery health information to the external device. In alternate embodiments, the battery pack 14 may communicate battery health information to a power tool/device when coupled to the power tool/device, and the power tool/device, in turn, may communicate the battery health information to an external device.

It should be understood that each block diagram is simplified and in accordance with the illustrated exemplary embodiment. The components and connections illustrated in the block diagrams are exemplary, and additional or fewer components/connections may be provided. For example, in FIG. 3A, the device 10 may include additional circuitry (for example, circuitry between the second switch 335 and the motor 22 to drive the motor 22 in a predetermined manner). Similarly, the flowcharts are simplified and exemplary, and additional or fewer steps may be provided.

Although the invention has been described in detail with reference to certain preferred embodiments, variations and modifications exist within the scope and spirit of one or more independent aspects of the invention as described.

We claim:
1. A battery pack comprising:
a housing configured to be removably coupled to and supported by a device configured to receive power from the battery pack, the housing including a base housing and a stem housing, the stem housing coupled to and extending from the base housing, the stem housing configured to be inserted into a battery receptacle of the device;
a plurality of battery cells supported in the housing, the plurality of battery cells-including a plurality of first battery cells and a plurality of second battery cells, wherein:
the base housing is configured to house the plurality of first battery cells,
the stem housing is configured to house the plurality of second battery cells,
each one of the plurality of first battery cells has a first physical size and a first operational characteristic,
each one of the plurality of second battery cells has a second physical size different than the first physical size and a second operational characteristic different than the first operational characteristic, and
each one of the first battery cells is electrically connectable in parallel with a respective one of the second battery cells to form a plurality of parallel-connected combinations of battery cells of different physical size; and a terminal configured to be electrically connected to the plurality of first battery cells and the plurality of second battery cells, wherein:

the plurality of parallel-connected combinations of battery cells of different physical size are electrically connectable in series to the terminal, and the power is transferrable, via the terminal, from the plurality of first battery cells and the plurality of second battery cells to the device.

2. The battery pack of claim 1, wherein the first physical size and the second physical size include at least one of a diameter of a respective battery cell or a length of the respective battery cell.

3. The battery pack of claim 1, wherein
a base configured to house the first battery cells, wherein the first physical size of the first battery cells is larger than the second physical size of the second battery cells.

4. The battery pack of claim 1, wherein the first battery cells and the second battery cells have substantially the same nominal voltage.

5. The battery pack of claim 1, further comprising an electronic processor configured to control one or more switches, wherein the one or more switches is configured to electrically disconnect at least one of the first battery cells and the second battery cells from the terminal.

6. The battery pack of claim 1, wherein the first operational characteristic and the second operational characteristic are selected from the group consisting of: an ampere-hour capacity and a temperature performance characteristic.

7. The battery pack of claim 1, wherein the device includes a power tool.

8. The battery pack of claim 1, wherein the plurality of battery cells are electrically connectable to each other via conductive straps that are laser welded to battery cell terminals of the plurality of battery cells.

9. The battery pack of claim 3, wherein
each of the second battery cells has a first diameter of eighteen millimeters; and
each of the first battery cells has a second diameter of greater than eighteen millimeters.

10. The battery pack of claim 5, further comprising a sensor configured to be electrically connected to the electronic processor, wherein the electronic processor is further configured to:
determine at least one of an ambient condition of the battery pack and an operational condition of the battery pack; and
control the one or more switches to electrically disconnect the at least one of the first battery cells and the second battery cells from the terminal based on the at least one of the ambient condition and the operational condition.

11. A method of powering a device, the method comprising:
providing a battery pack including:
a housing configured to be removably connected to and supported by the device configured to receive power from the battery pack, the housing including a base housing and a stem housing, the stem housing coupled to and extending from the base housing, the stem housing configured to be inserted into a battery receptacle of the device; and a plurality of battery cells supported in the housing, the plurality of battery cells including a plurality of first battery cells and a plurality of second battery cells, wherein:

the base housing is configured to house the plurality of first battery cells, the stem housing is configured to house the plurality of second battery cells, each one of the plurality of first battery cells has a first physical size and a first operational characteristic, each one of the plurality of second battery cells has a second physical size different than the first physical size and a second operational characteristic different than the first operational characteristic, and each one of the first battery cells is electrically connectable in parallel with a respective one of the second battery cells to form a plurality of parallel-connected combinations of battery cells of different physical size; and transferring, via a terminal of the battery pack configured to be electrically connected to the plurality of first battery cells and the plurality of second battery cells, the power from the plurality of first battery cells and the plurality of second battery cells to the device, wherein the plurality of parallel-connected combinations of battery cells of different physical size are electrically connectable in series to the terminal.

12. The method of claim 11, wherein the first physical size and the second physical size include at least one of a diameter of a respective battery cell and a length of the respective battery cell.

13. The method of claim 11, wherein the first battery cells and the second battery cells have substantially the same nominal voltage.

14. The method of claim 11, further comprising controlling, with an electronic processor, one or more switches, wherein the one or more switches is configured to electrically disconnect at least one of the first battery cells and the second battery cells from the terminal.

15. The method of claim 14, further comprising:
receiving, with the electronic processor, a signal from a sensor of the battery pack;
determining, with the electronic processor, at least one of an ambient condition of the battery pack and an operational condition of the battery pack based on the signal; and
controlling, with the electronic processor, the one or more switches to electrically disconnect the at least one of the first battery cells and the second battery cells from the terminal based on the at least one of the ambient condition and the operational condition.

16. A battery pack comprising:
a housing including a base housing and a stem housing, the stem housing coupled to and extending from the base housing, the stem housing configured to be inserted into a battery receptacle of the device;
a plurality of battery cells supported in the housing, the plurality of battery cells including a plurality of first battery cells and a plurality of second battery cells, wherein:
the base housing is configured to house the plurality of first battery cells,
the stem housing is configured to house the plurality of second battery cells, each one of the plurality of first battery cells has a first physical size and a first characteristic, each one of the plurality of second battery cells has a second physical size different than the first physical size and a second characteristic different than the first characteristic, the first characteristic and the second characteristic being at least one of a shape, a chemistry, and an operational characteristic, and each one of the first battery cells is electrically connectable in parallel with a respective one of the second battery cells to form a plurality of parallel-connected combinations of battery cells of different physical size; and a terminal electrically connected to the plurality of first battery cells and the plurality of second battery cells, wherein the plurality of parallel-connected combinations of battery cells of different physical size are electrically connectable in series to the terminal.

17. The battery pack of claim 16, wherein the operational characteristic is at least one of an Ampere-hour capacity and a temperature performance characteristic.

18. The battery pack of claim 16, wherein the first battery cells and the second battery cells have substantially the same nominal voltage.

* * * * *